United States Patent
Migos et al.

(10) Patent No.: US 10,691,323 B2
(45) Date of Patent: Jun. 23, 2020

(54) COLUMN FIT DOCUMENT TRAVERSAL FOR READER APPLICATION

(71) Applicant: Apple Inc., Cupertino, CA (US)

(72) Inventors: Charles J. Migos, Millbrae, CA (US); Martin J. Murrett, San Francisco, CA (US); Ian J. Elseth, Vancouver, WA (US); Allison M. Styer, San Francisco, CA (US); Jacob Refstrup, San Jose, CA (US); Alastair K. Fettes, San Francisco, CA (US); Gregory C. Langmead, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 673 days.

(21) Appl. No.: 14/871,924

(22) Filed: Sep. 30, 2015

(65) Prior Publication Data
US 2016/0299655 A1    Oct. 13, 2016

Related U.S. Application Data

(60) Provisional application No. 62/146,219, filed on Apr. 10, 2015.

(51) Int. Cl.
*G06F 3/0485* (2013.01)
*G06F 3/0483* (2013.01)
(Continued)

(52) U.S. Cl.
CPC .......... *G06F 3/0485* (2013.01); *G06F 3/0483* (2013.01); *G06F 3/04842* (2013.01);
(Continued)

(58) Field of Classification Search
CPC ............... G06F 3/04886; G06F 3/0488; G06F 2203/04808; G06F 3/0485; G06F 3/0481;
(Continued)

(56) References Cited

U.S. PATENT DOCUMENTS 5,634,064 A    5/1997  Warnock et al.
5,923,323 A    7/1999  Chiu et al.
(Continued)

FOREIGN PATENT DOCUMENTS

WO    2010078475    7/2010
WO    2014/026069 A1    2/2014

OTHER PUBLICATIONS

Bederson, et al., "A Fisheye Calendar Interface for PDAs: Providing Overviews for Small Displays," ACM Extended Abstracts on Human Factors in Computing Systems, Apr. 2003, pp. 618-619.
(Continued)

*Primary Examiner* — Maryam M Ipakchi
(74) *Attorney, Agent, or Firm* — Kilpatrick Townsend & Stockton LLP

(57) ABSTRACT

An electronic device displays a view of a lower portion of a first column from a document. The document includes at least a first column and a second column. A first user input gesture is received by the electronic device. In response to detecting the first user input gesture, the electronic device displays an animated transition from the view of the lower portion of the first column to a view of an upper portion of the second column.

22 Claims, 16 Drawing Sheets

(51) Int. Cl.
*G06F 3/0488* (2013.01)
*G06F 3/0484* (2013.01)
*G06T 13/80* (2011.01)

(52) U.S. Cl.
CPC .......... *G06F 3/04883* (2013.01); *G06T 13/80* (2013.01); *G06F 2203/04806* (2013.01)

(58) Field of Classification Search
CPC .. G06F 3/0483; G06F 3/04842; G06F 3/0482; G06F 17/30994; G06F 2203/04807; G06T 2200/24
See application file for complete search history.

(56) References Cited

U.S. PATENT DOCUMENTS

| | | |
|---|---|---|
| 8,018,431 B1 | 9/2011 | Zehr et al. |
| 8,145,995 B2 | 3/2012 | Rohrabaugh et al. |
| 8,395,643 B2 | 3/2013 | Ramig et al. |
| 8,527,909 B1 | 9/2013 | Mullany |
| 8,886,836 B2 | 11/2014 | Luu |
| 9,007,405 B1 | 4/2015 | Eldar et al. |
| 9,542,363 B2 | 1/2017 | Barber |
| 9,600,447 B2 | 3/2017 | Wabyick et al. |
| 9,671,951 B2 | 6/2017 | Chi et al. |
| 9,874,995 B2 | 1/2018 | Ramanathan et al. |
| 10,019,139 B2 | 7/2018 | Smith et al. |
| 10,152,463 B1 | 12/2018 | Sham |
| 10,198,409 B2 | 2/2019 | Khambanonda et al. |
| 10,216,708 B2 | 2/2019 | Wabyick et al. |
| 10,268,661 B2 | 4/2019 | Tashman et al. |
| 10,296,558 B1 | 5/2019 | McInerny |
| 2003/0014445 A1 | 1/2003 | Formanek et al. |
| 2009/0199090 A1 | 8/2009 | Poston et al. |
| 2010/0103124 A1 | 4/2010 | Kruzeniski et al. |
| 2011/0163968 A1 | 7/2011 | Hogan |
| 2012/0192118 A1 | 7/2012 | Migos et al. |
| 2013/0080913 A1 | 3/2013 | Rodrig et al. |
| 2013/0198661 A1* | 8/2013 | Matas ................. G06F 3/048 715/762 |
| 2013/0198682 A1* | 8/2013 | Matas ................. G06T 11/60 715/784 |
| 2013/0346913 A1 | 12/2013 | Smith |
| 2014/0013216 A1 | 1/2014 | Sakuta |
| 2014/0164911 A1 | 6/2014 | Nickolov et al. |
| 2014/0325407 A1 | 10/2014 | Morris et al. |
| 2016/0182423 A1 | 6/2016 | Tevosyan |

OTHER PUBLICATIONS

Chiu, et al., "Content Based Automatic Zooming: Viewing Documents on Small Displays," ACM International Conference on Multimedia, Oct. 2008, pp. 817-820.

* cited by examiner

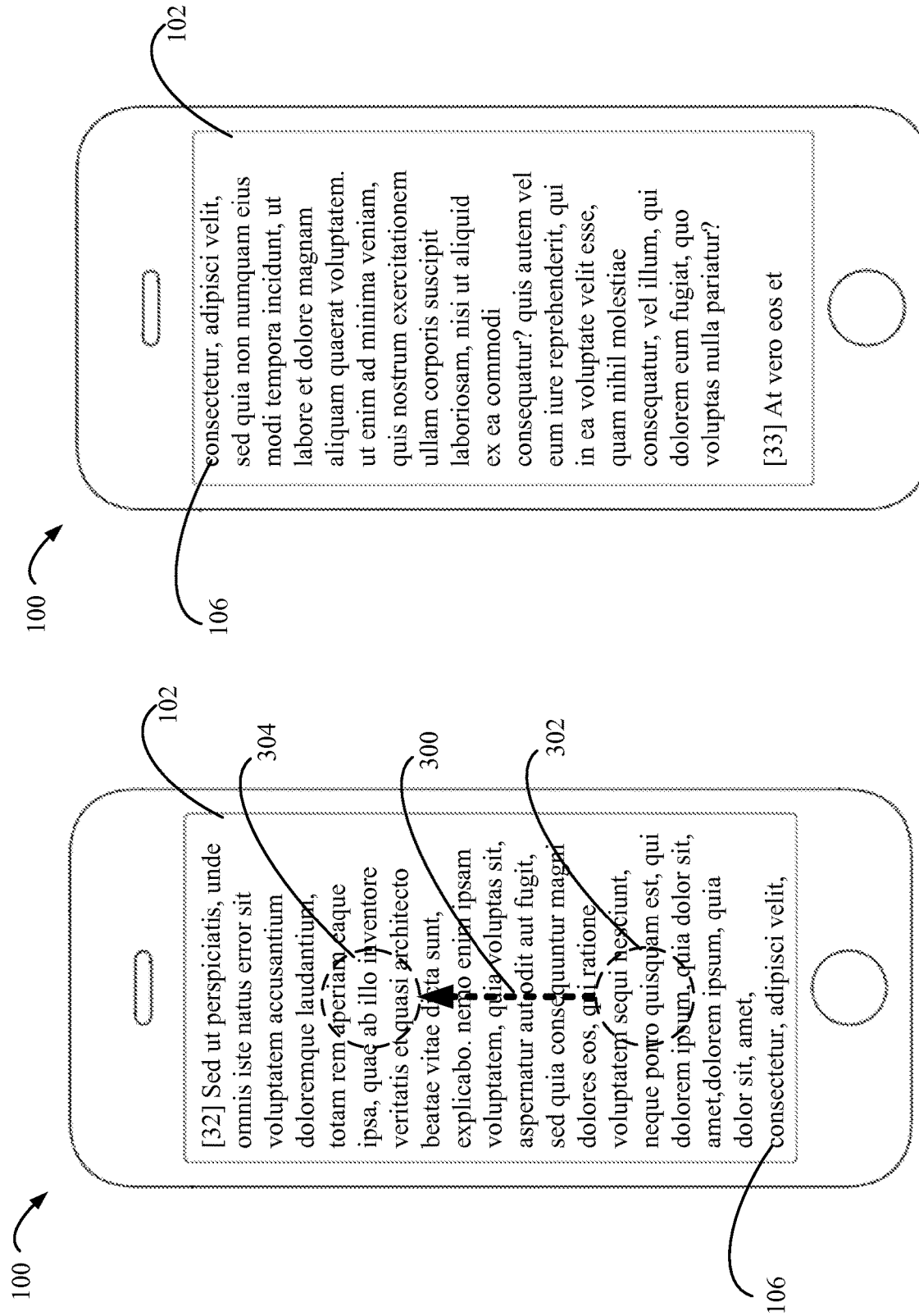

*FIG. 11C*
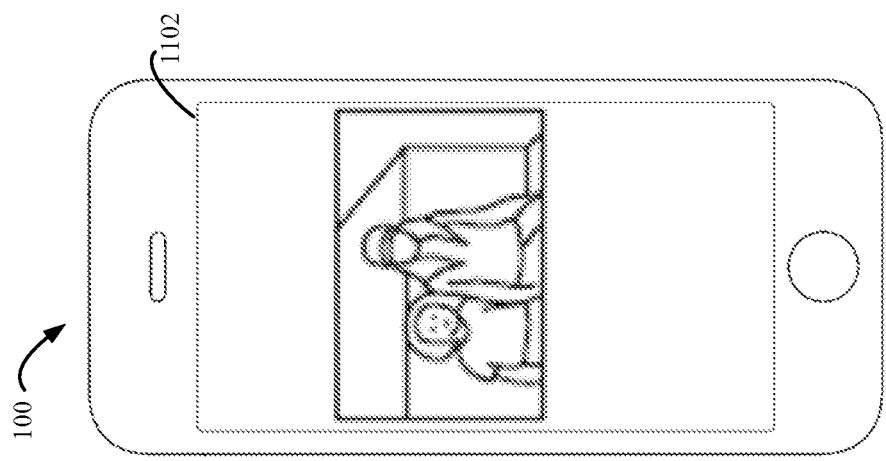
*FIG. 11B*
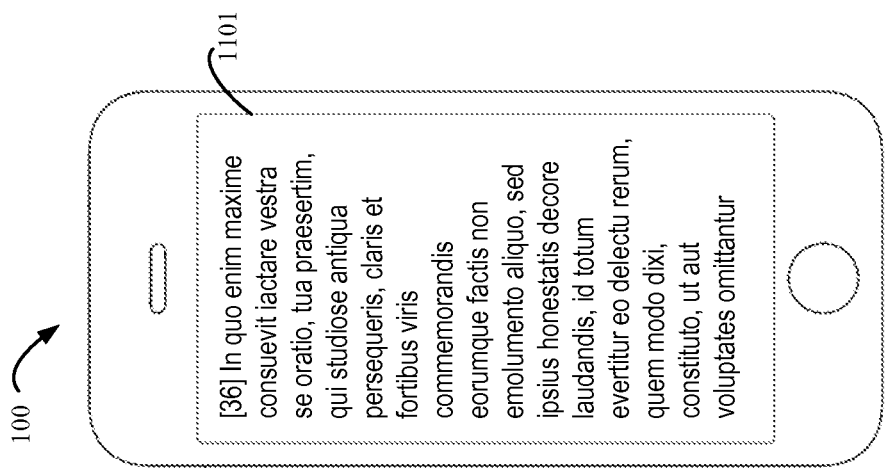
*FIG. 11A*
*FIG. 11*

COLUMN FIT DOCUMENT TRAVERSAL FOR READER APPLICATION

CROSS-REFERENCE TO RELATED APPLICATION

The present application claims the benefit of and priority to U.S. Provisional Application No. 62/146,219 entitled "COLUMN FIT DOCUMENT TRAVERSAL FOR READER APPLICATION", filed on Apr. 10, 2015, the entire contents of which is incorporated herein by reference for all purposes.

BACKGROUND

The present disclosure relates generally to traversing a document displayed in a graphical user interface of an application such as a reader application. In particular, the disclosure relates to presentation of a document that includes multiple columns of text.

Documents can appear in various formats, such as a fixed format. In a fixed format, text and images are laid out according to, for example, columns. Examples of fixed format documents can include textbooks, newspapers, magazine articles, etc. Use of fixed format documents allows non-text content such as images to be presented at a fixed position relative to relevant text. Multiple articles may be arranged on a page in a visually appealing manner. These and other aspects of fixed format documents may improve the visual appearance and readability of document content. For example, a fixed format document can more closely resemble the arrangement and appearance of text and images from a textbook.

When a document including multiple columns is displayed on a device having a small display size relative to the medium for which a document was originally formatted, the content of columns may be smaller than is desirable for some users. Users may benefit from a presentation of multi-column documents that improves legibility. Further, when a fixed format document is displayed on a device, users may benefit from a method of viewing content in a consistent manner.

BRIEF SUMMARY

In accordance with exemplary embodiments, a method is described. The method includes displaying, with a display of an electronic device, a view of a lower portion of a first column from a document. The document includes at least a first column and a second column. A first user input gesture is received by the electronic device. In response to detecting the first user input gesture, the display of the electronic device displays an animated transition from the view of the lower portion of the first column to a view of an upper portion of the second column.

Other exemplary embodiments are directed to electronic devices, and computer readable media associated with methods described herein.

A better understanding of the nature and advantages of the exemplary embodiments may be gained with reference to the following detailed description and the accompanying drawings.

BRIEF DESCRIPTION OF THE DRAWINGS

FIGS. 3A and 3B illustrate a transition from displaying an upper portion of a current column to a lower portion of a current column, according to an exemplary embodiment.

FIGS. 5A, 5B and 5C illustrate a transition from displaying content in a guided-pan mode to a full-page mode, according to an exemplary embodiment.

FIGS. 11A, 11B and 11C show an illustrative electronic device traversing a document having a page that does not include body text, according to an exemplary embodiment.

DETAILED DESCRIPTION

Figure 1:
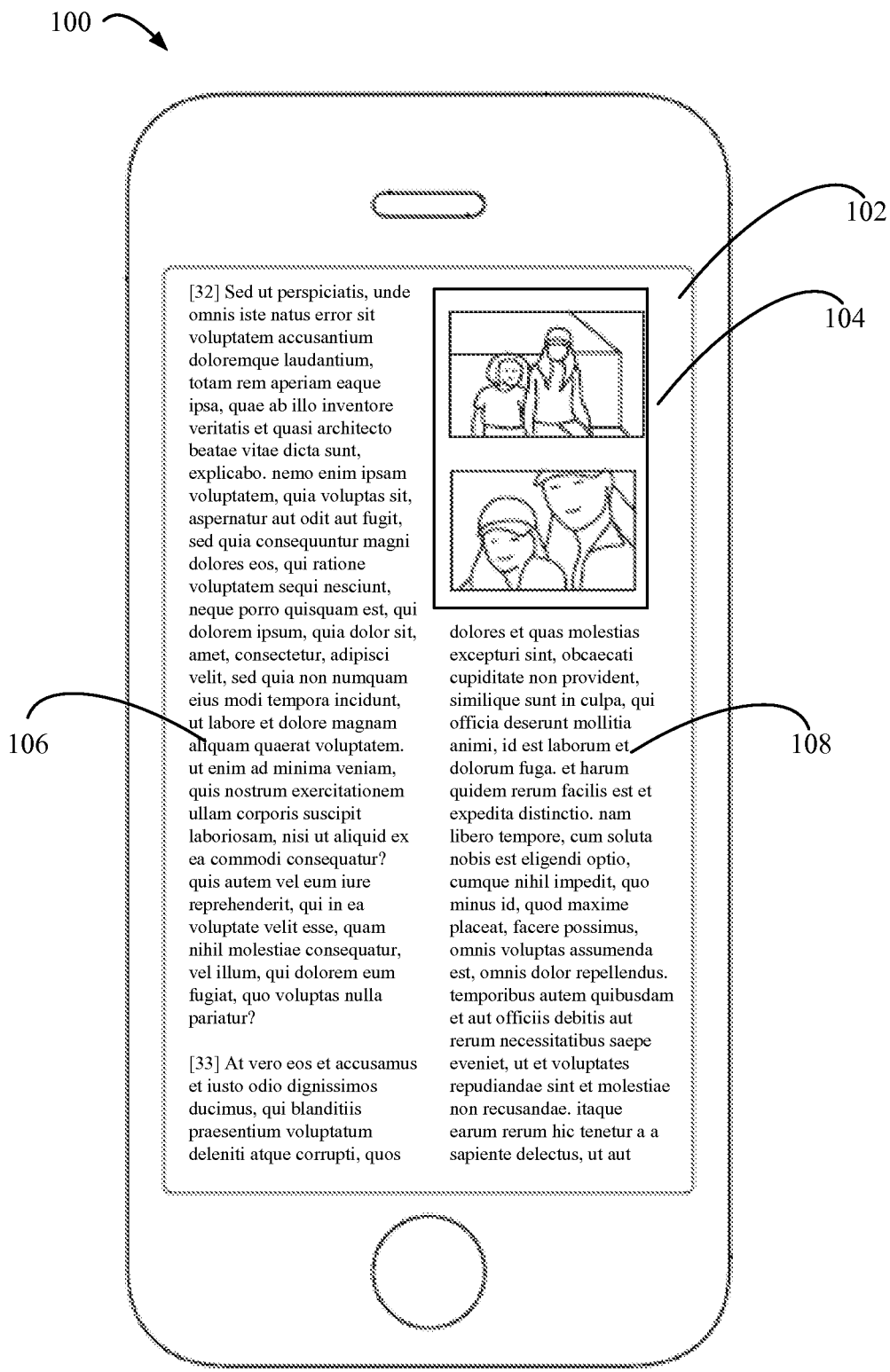
FIG. 1 shows an illustrative electronic device displaying a page of a document, according to an exemplary embodiment.

In accordance with various exemplary embodiments, a technique is described for displaying a document with content presented in multiple columns, such as a fixed-format document. The columns of the document may be presented using a desirable column size, e.g., for legibility of the content. A zoom level of the content can be adjusted according to the column size.

An "electronic device" as described herein may be any computing device capable of displaying an image, such as a portable electronic device (e.g., mobile phone, media player, tablet, wearable device, laptop, personal digital assistant, gaming device, etc.), desktop electronic device, or other computing device. The electronic device may include a touch-sensitive surface, such as a touchscreen and/or touchpad. The electronic device may display an image using an integrated display component, e.g., by rendering the image on the display. In some exemplary embodiments, an electronic device may display an image by transmitting the image to a remote device (e.g., a monitor, navigation unit, or other remote device communicatively connected to the electronic device). The electronic device may be capable of executing one or more applications. Applications executed by a device may include, for example, a document reader, an Internet browser, a word processing application, or other application capable of displaying a document.

A "document" as described herein may be an electronic book, a document formatted for portability, a file produced and/or used by a word processing application, a website, a webpage, or any other document. An electronic book can include, for example, a multi-touch book or an author book. A multi-touch book or an author book is an interactive electronic document. A document may include one or more pages. For example, an electronic book may include a series of pages. In another example, a website may include a set of one or more interlinked pages (i.e., webpages, such as webpages defined by an HTML document.) A page may include multiple columns.

A "column" as described herein may include content such as text, images, video, and/or other content. The content of a column may be arranged in a block configuration. A column may substantially or fully span the vertical extent of a page and partially span the horizontal extent of a page. For example, a page with two columns may include a column located on the left half of the page and another column located on the right half of the page. A whitespace area (i.e. "gutter"), such as a vertical stripe of whitespace, may be located between two columns on a page. As described further below, a page may be partially displayed such that a single column or part of a single column is visible within the area of the display.

A "gesture" as described herein may include an input that corresponds to a pattern stored and recognized by an electronic device. An electronic device may store one or more responses in association with a gesture. In response to receiving a gesture, the electronic device may perform one or more of the responses associated with the gesture. The response associated with the gesture may vary, for example, between a portrait mode and a landscape mode of the electronic device. An input may be, for example, a contact received at a touch-sensitive surface such as a touchpad or touchscreen. In some exemplary embodiments, a gesture input may be provided with a finger, multiple fingers, a thumb, a combination of a finger and a thumb, a mouse or other input device.

Gestures may include, e.g., a linear swipe, a diagonal swipe, a pan, a flick, a tap, a double tap, a tap and hold, a pinch and a stretch. A linear swipe is a motion from a first point to a second point on a display, such as a swipe of a finger along a touch-sensitive surface from a starting contact point to an ending contact point. A diagonal swipe is similar to a linear swipe but the motion is made at a diagonal on the display. For example, from a right top corner of a display to a bottom left corner of the display. A pan can be similar to a swipe but contact on the display can be maintained for a longer period of time. For example, a user can maintain contact on the display while moving their finger on the content. A flick is a quick swiping motion. A flick is input at a higher rate of motion than a swipe. A flick can be made upward (upward flick) or downward (downward flick).

A tap can include touching or tapping the display a single time. A double tap can include touching or tapping the display two times. A tap and hold can include touching a point on the display and maintaining the hold for a predetermined amount of time. A pinch can include making a pinching motion using, for example, a thumb and forefinger on the display. A stretch can include, for example, separating the thumb and forefinger on the display. A result of the gesture can vary according to, for example, a type of the document and a layout of the document. Various types of gestures can be used and the above gestures are merely examples.

"Zoom" as indicated herein may refer to digitally altering the size of document content. For example, when zoom is increased, the magnification level of a displayed document may be increased. Increasing the zoom level may reduce the area of a document visible in a portion of a display in which the document is displayed. Similarly, when zoom is decreased, the magnification level of the displayed document may be decreased.

Content from a document can be displayed in different modes. For example, content can be displayed in a full-page mode or a guided-pan mode. In a full-page mode or whole-page mode, a full-page of the document will appear on the display. As a user pans through the document, a full-page will appear on the display at a given time. In a guided-pan mode, a part of a page of the document, such as a column, will appear on the display. As a user pans through the document, a part of a page of the document will appear on the display. In a guided-pan mode, content can be displayed according to a column fit mode.

In a column fit mode, text can remain in columns as formatted by an author of the document. For example, in a textbook, columns can have different widths, spacing, and indentations according to the content being described and the images which are included on the page. When a user views a document in a guided-pan mode, the content will remain in a column fit mode. That is, the content will remain in column formatting. If there is more text in a particular column, the text of the column being viewed may be smaller. If there is less text in a particular column, the text of the column being viewed may appear larger. The text is displayed according to, for example, the amount and type of content which appears in the column of a document and the size and shape of the display area of the electronic device. Therefore, in a column fit mode, the content can be appropriated to fit in a column.

FIG. 1 shows an illustrative electronic device 100 displaying a page 104, according to an exemplary embodiment. The content displayed in FIG. 1 can be according to a full-page mode. Electronic device 100 includes display 102. Page 104 including multiple columns 106, 108 is displayed by electronic device 100 at display 102. Page 104 may be a page from among a series of pages of a document, such as an electronic book.

In the full-page mode, if a user swipes from left to right on page 104, and there is a previous page in the document, a full previous page can be displayed. If a user swipes from right to left on page 104, and there is subsequent page in the document, a full subsequent page can be displayed.

Displaying the entirety of page 104 on display 102 may be desirable in various situations, such as when a user wishes to see all content available on a page, to provide context for a column within a document or a page of a document during traversal of the document, etc. When display 102 is displaying the entirety of page 104, including left column 106 and right column 108, the content of columns 106, 108 may be smaller than is desirable for some readers. For example, legibility of text and images within columns 106, 108 may be limited by the size of the displayed content on the display 102.

Figure 2A:
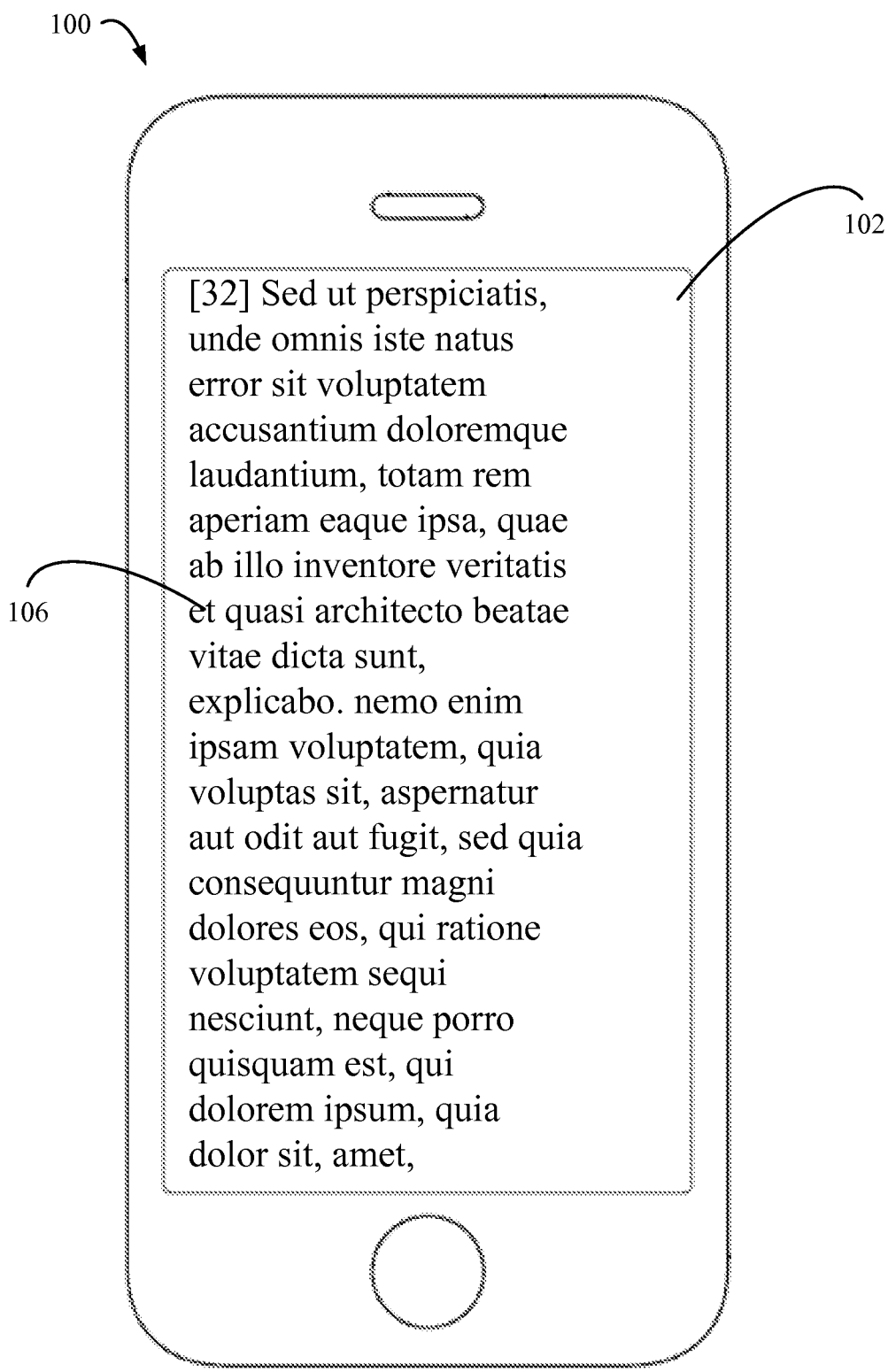
FIGS. 2A and 2B show an illustrative electronic device displaying content from a single column of a page of a document, according to an exemplary embodiment.
Figure 2B:
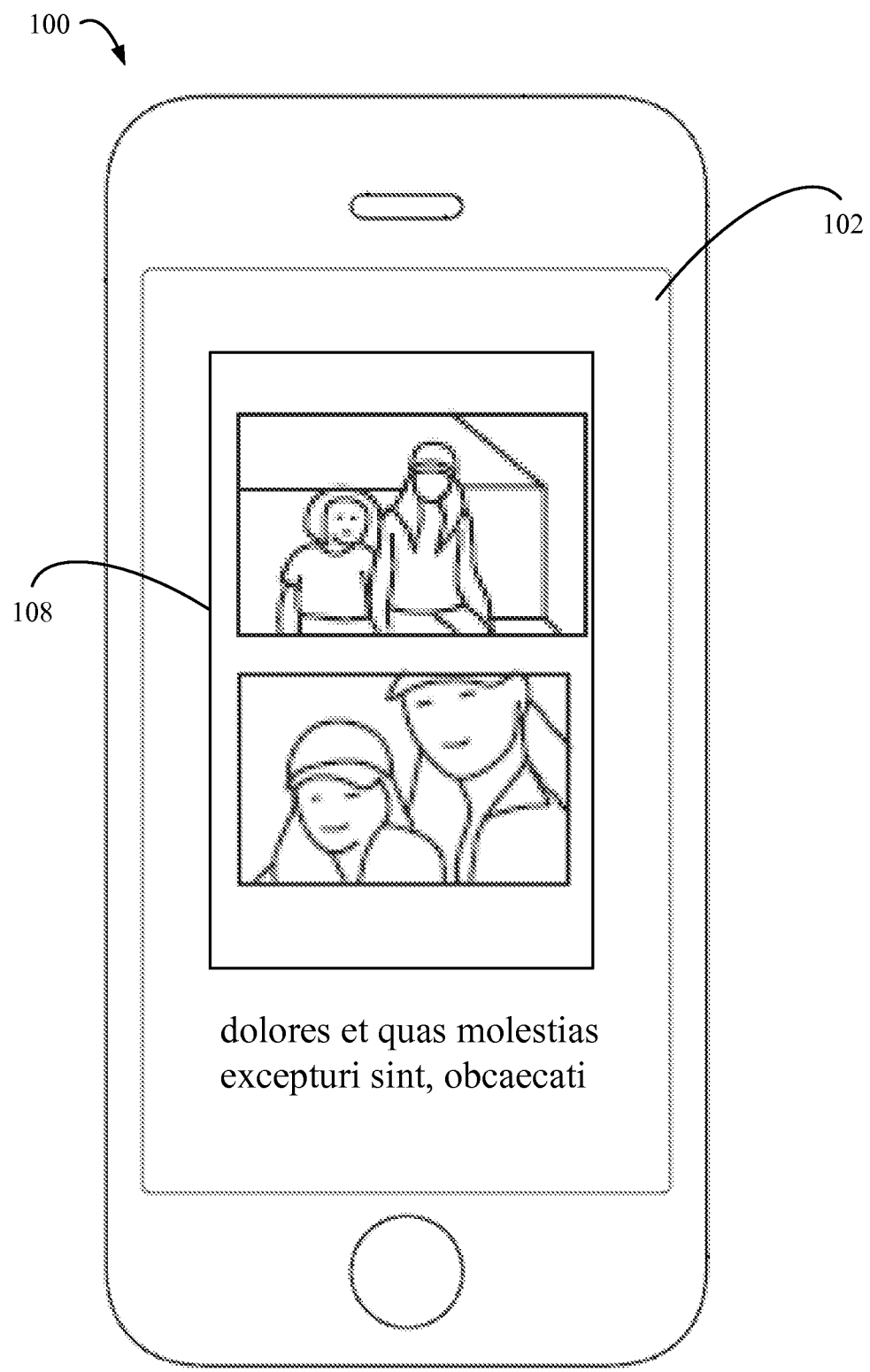

FIGS. 2A and 2B show an illustrative electronic device 100 displaying content from a single column 106 of page 104 and from a single column 108 of page 4, respectively. The content displayed in FIGS. 2A and 2B can be according to a guided-pan mode which incorporates a column fit mode. In FIG. 2A, the legibility of the text of column 106 may be improved for some readers because of the increased size of the content (e.g., the text of column 106) when a single column is displayed within the area of display 102.

In some exemplary embodiments, a transition from the whole page view of page 104 as displayed in FIG. 1 to the single column view of page 104 as displayed in FIG. 2A may occur in response to user input received by electronic device 100. Electronic device 100 may receive input via a touch-sensitive surface. For example, display 102 may be a touch-screen display. A transition from the whole page view of page 104 as displayed in FIG. 1 to the single column view of page 104 as displayed in FIGS. 2A and 2B may occur in response to, e.g., a "double tap" input, such as a brief contact of a finger with a portion of a touchscreen display two times. For example, when a user double taps display 102 at a portion of display 102 in which column 106 is shown, a transition may occur to display a column 106 as a single column within the area of display 102. A double tap is described, however, this is merely an example. If a user were to tap only once, a toolbar for the application can be invoked.

Different types of inputs may be used to transition from display of page 104 at a first zoom level (e.g., as indicated at FIG. 1) to a second zoom level (e.g., as indicated at FIGS. 2A and 2B) and/or to transition from a second zoom level to a first zoom level. In various exemplary embodiments, electronic device 100 may perform the transition from a whole page view to a single column view in response to another type of input.

Electronic device 100 may determine a location of the display 102 at which an input is received. If the input was received at a location of the whole page view of FIG. 1 where column 106 is shown, electronic device 100 may display column 106 in a single column view as indicated in FIG. 2A. If the input was received at a location of the whole page view of FIG. 1 where column 108 is shown, electronic device may display column 108 in a single column view as indicated in FIG. 2B. Electronic device 100 may determine a column position displayed at a location of display 102 at which the input was received. For example, if the input was received at a position within an upper portion of column 106 displayed in the whole page view, electronic device 100 may display the upper portion of column 106 in a single column view. If the input was received at a position within a lower portion of column 106 displayed in the whole page view, electronic device 100 may display the lower portion of column 106 in a single column view.

Although electronic device 100 is shown with display 102 displaying a single column (e.g., column 106) in "portrait" mode in FIGS. 2A and 2B, a single column may similarly be shown in "landscape" mode. For example, if at any time the electronic device 100 is rotated by the user (e.g., rotated by 90 degrees relative to the orientation shown at FIGS. 2A and 2B), a single column 106 may be displayed in landscape mode such that the single column is displayed within the area of display 102 in landscape mode. Gestures on the display can provide different results according to whether the electronic device 100 is in a portrait mode or a landscape mode. Further, the amount of content that is displayed on the display can vary according to portrait mode or landscape mode.

In FIG. 2A, the upper portion of column 106 from page 104 is displayed at display 102. Electronic device 100 may receive user input to change the content from page 104 displayed by display 102. For example, electronic device 100 may receive user input to display content from a lower portion of column 106 than the portion of column 106 that is currently displayed at display 102.

FIGS. 3A and 3B illustrate a transition from displaying an upper portion of column 106 to a lower portion of column 106, according to an exemplary embodiment. At FIG. 3A, an upper portion of the content of column 106 is displayed by display 102. At FIG. 3B, a lower portion of the content of column 106 is displayed by display 102. In some exemplary embodiments, a column may include one or more portions, such as an upper portion (e.g., the "top" of the column), one or more central portions, and a lower portion (e.g., the "bottom" of the column). A lower portion may refer to any portion of a column that is lower than the currently displayed portion of the column, and an upper portion may refer to any portion of a column that is above the currently displayed portion of the column.

Electronic device 100 may transition from displaying an upper portion of column 106 to a lower portion of column 106 in response to user input received at electronic device 100. Electronic device 100 may use an animation to indicate the transition as (and/or after) the input gesture is received. For example, the text of column 106 may be animated such that the text appears to gradually roll upward as the input gesture is received. Further, a zoom level of the text of column 106 can change as the input gesture is received.

Electronic device 100 may perform the transition illustrated in FIGS. 3A and 3B in response to a gesture input received at a touch-sensitive surface of electronic device 100. For example, the gesture input may be an input 300 that occurs when user "swipes upward" by dragging a finger along display 102 from a lower contact position indicated by circle 302 of FIG. 3A to an upper contact position indicated by circle 304 of FIG. 3A. In response to the upward swipe, electronic device 100 may display a lower portion of the content of column 106, as indicated at FIG. 3B. The transition from the display of the upper portion of the content of column 106 as indicated at FIG. 3A to the display of the lower portion of the content of column 106, as indicated at FIG. 3B may be presented as a gradual animated transition as (and/or after) the upward swipe occurs.

If a user uses a pan gesture, that is, the user maintain contact with display 102 while panning from, for example, the bottom of column 106 toward the top of column 106, the animation can appear as a change in zoom level. The zoom level of the text can decrease and additional content of page 104 can be displayed on the display 102, thereby giving a user additional context. When the user stops panning at a particular location on column 106, the text can return to its original display size for column 106.

It will be recognized that, where an upward swipe, pan, and other particular gestures are described herein, alternative gestures and other inputs may be used to adjust the content displayed by display 102, including an upward flick, a downward swipe or flick, a horizontal swipe (e.g., right-to-left swipe or left-to-right swipe) or flick, a diagonal swipe or flick, a tapping input, an input provided with two or more fingers (such as a pinching gesture), etc. A flick may be a gesture input provided at a higher rate of motion than a swipe. Different input types may be used by electronic device 100 to determine whether a transition in zoom level is to occur as the column content of page 104 displayed by the electronic device change.

Figure 4A:
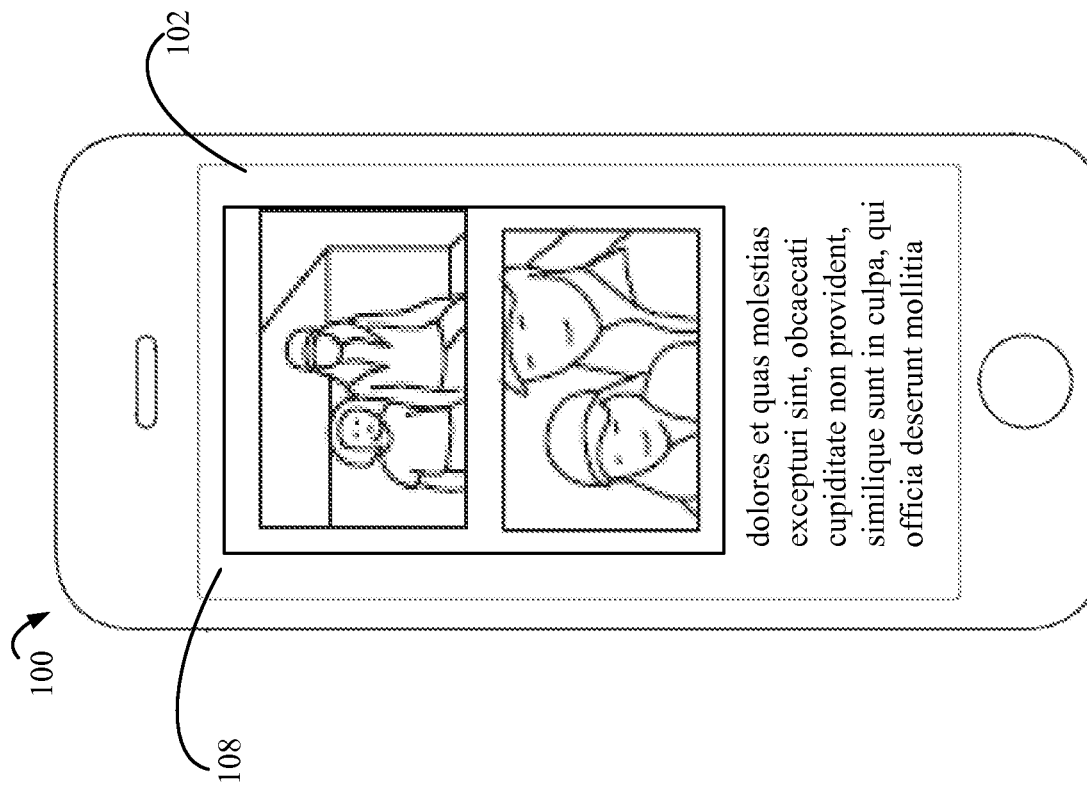
FIGS. 4A and 4B illustrate a transition from displaying a lower portion of a current column to an upper portion of a subsequent column, according to an exemplary embodiment.
Figure 4B:
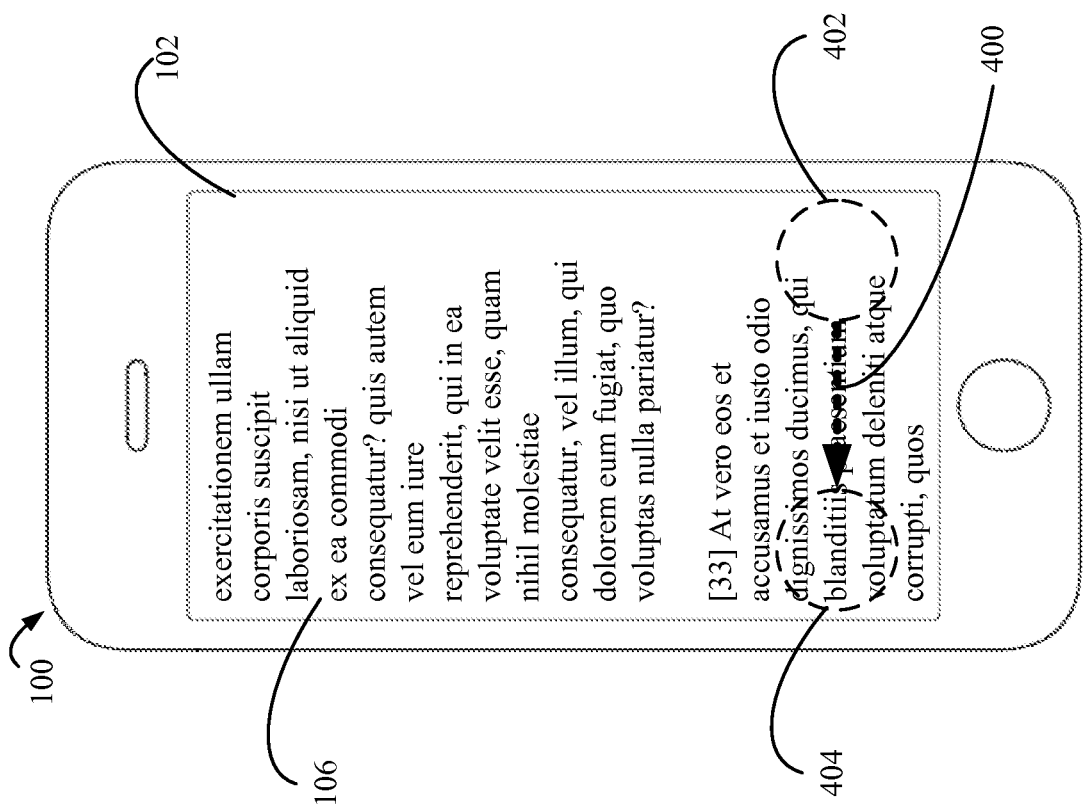

FIGS. 4A-4B illustrate a transition from displaying a lower portion of column 106 to displaying an upper portion of column 108, according to an exemplary embodiment. At FIG. 4A, a lower portion of the content of column 106 is displayed by display 102. At FIG. 4B, an upper portion of the content of column 108 is displayed by display 102.

Electronic device 100 may transition from displaying a lower portion of column 106 to displaying an upper portion of column 108 in response to user input received at electronic device 100. Electronic device 100 may use an animation to indicate the transition as (and/or after) the input gesture is received. For example, page 104 may be animated such that it appears to slide diagonally to the lower right as the input gesture is received. Further, page 104 may be animated by changing a zoom level of page 104.

In some exemplary embodiments, electronic device 100 may perform the transition illustrated in FIGS. 4A and 4B in response to a gesture input received at a touch-sensitive surface of electronic device 100. For example, the gesture input may be an input 400 that occurs when a user swipes from right to left by dragging a finger along display 102 from a lower right contact position indicated by circle 402 of FIG. 4A to a lower left contact position indicated by circle 404 of FIG. 4A. In response to the right-to-left swipe, electronic device displays a upper portion of the content of column 108, as indicated at FIG. 4B. The transition from the display of the lower portion of the content of column 106 as indicated at FIG. 4A to the display of the upper portion of the content of column 108, as indicated at FIG. 4B may be presented as a gradual animated transition as the right-to-left swipe occurs.

In the guided-pan mode, if the user is at a bottom of a column, when the user swipes from right to left, the top of the subsequent column appears. If the user it at the top of a column and swipes from left to right, the bottom of the previous column appears. Therefore, a reading order is followed.

It will be recognized that the transitions described herein, such as the transition described with regard to FIGS. 4A and 4B, may be used for a transition from a column of a current page to a column of a subsequent page, a transition from a current page to a subsequent page, a transition from a current column to a previous column, a transition from a current page to a previous page, etc. Different input types or different directions of gesture input may be used by electronic device 100 in order to determine the appropriate destination (e.g., subsequent column, subsequent page, previous column, previous page, etc.) of a transition.

As illustrated in FIGS. 3A-3B, a user reading page 104 displayed by electronic device 100 can swipe continuously upward to advance through column 106. When the end of column 106 is reached, the user may swipe from right to left to advance from a lower portion of column 106 to an upper portion of column 108. In this way, columns 106, 108 of page 104 are navigable in an intuitive and user-friendly manner.

If a user continues to swipe upward on a column and they have reached the end of a column, a user can be notified that they have reached the end of a column through an animation. For example, a zoom level of the text in the bottom of column 106 may decrease, that is the size of the text may decrease, and then revert back to the original size of the text in the bottom of the column 106. Therefore, the text may change in size and then snap back to their original display size. No additional text appears and the user is "locked" to the column. Therefore, the user is informed that they are at the end of a column.

Figures 5A, 5B, 5C:
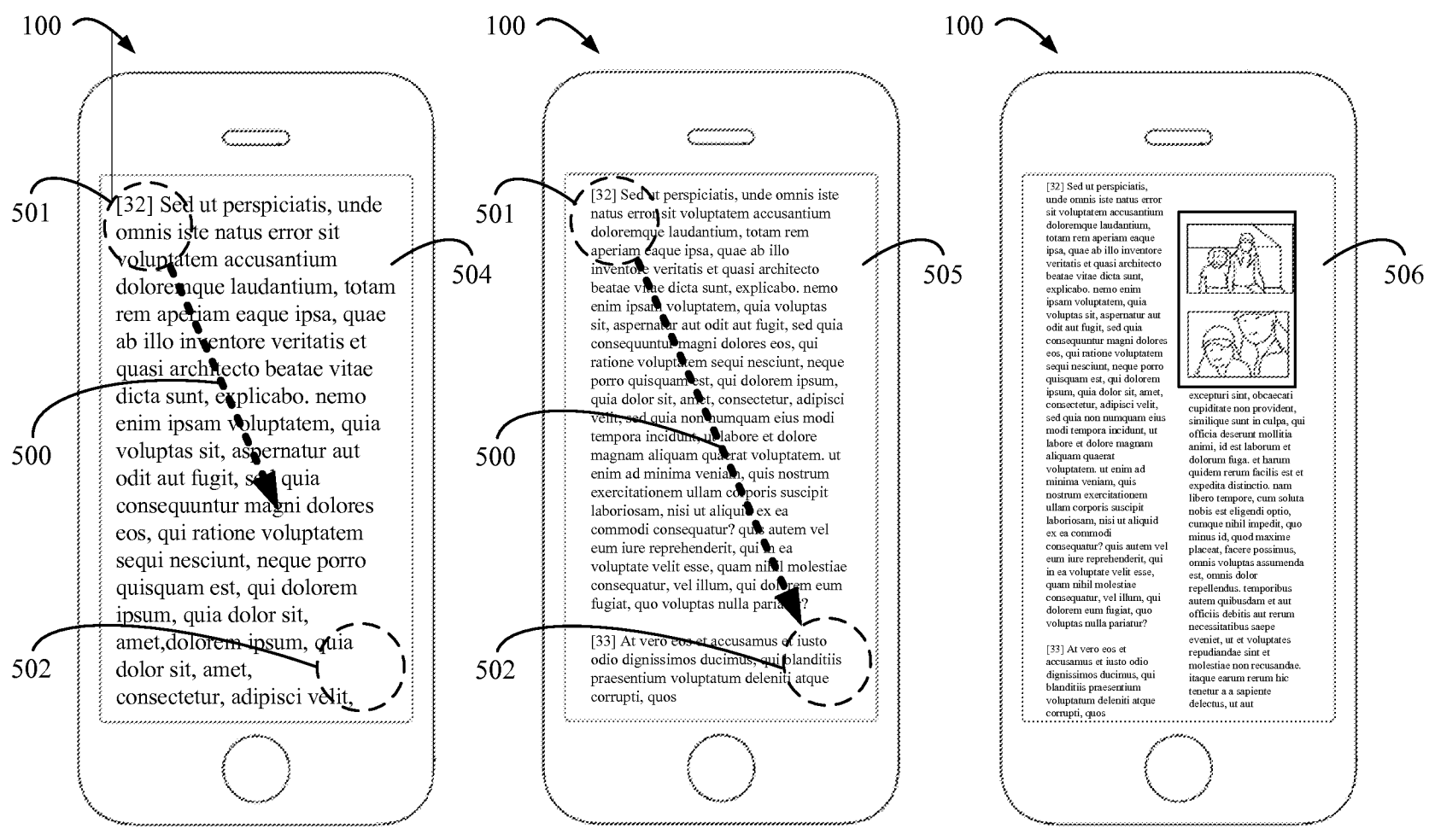

FIGS. 5A, 5B and 5C illustrate a transition from displaying content in a guided-pan mode to a full-page mode, according to an exemplary embodiment.

As shown in FIG. 5A, the content 504 is displayed in guided-pan mode. A drag, swipe, or a pinch that results in displaying a large portion of the page can be used to exit the guided-pan mode and enter the full-page mode. For example, an input 500 that results in displaying a large portion of the page can include touching a first point as indicated by circle 501 on an upper left corner of the display and maintaining contact with the display toward a lower right point of the display indicated by circle 502, as shown in FIG. 5A.

As the contact moves from, for example, a contact point indicated at circle 501 to a contact point indicated at circle 502, as shown in FIG. 5B the amount of content 505 displayed on the display can increase. If the user releases contact with the display at the contact point indicated at circle 502 and a majority of the page is displayed at that time, as shown in FIG. 5C, the document can enter the full-page mode and the full-page 506 is displayed.

However, if, for example, the user releases contact with the display at a point prior to the contact point indicated at circle 502, the content can continue to be displayed in a guided-pan mode. That is, the user may decide that they do not want to switch to the full-page mode or the user wanted to see more content on the page but did not want to exit the guided-pan mode. Therefore, the user can release contact with the display at a point between circle 501 and circle 502 to remain in a guided-pan mode.

Since the contact on the display from the contact pointed indicated at circle 501 to the contact point indicated at circle 502 extends along a large area of the display, the zoom level can be decreased, that is, the size of the text is decreased, thereby displaying more content on the display. Since content of the whole page or a majority of the page is displayed at the time contact with the display is released, the whole page is displayed. A top to bottom drag is described with respect to FIGS. 5A, 5B, and 5B, however, this is merely an example. The gesture can include, for example, a motion from bottom to top.

Figure 6:
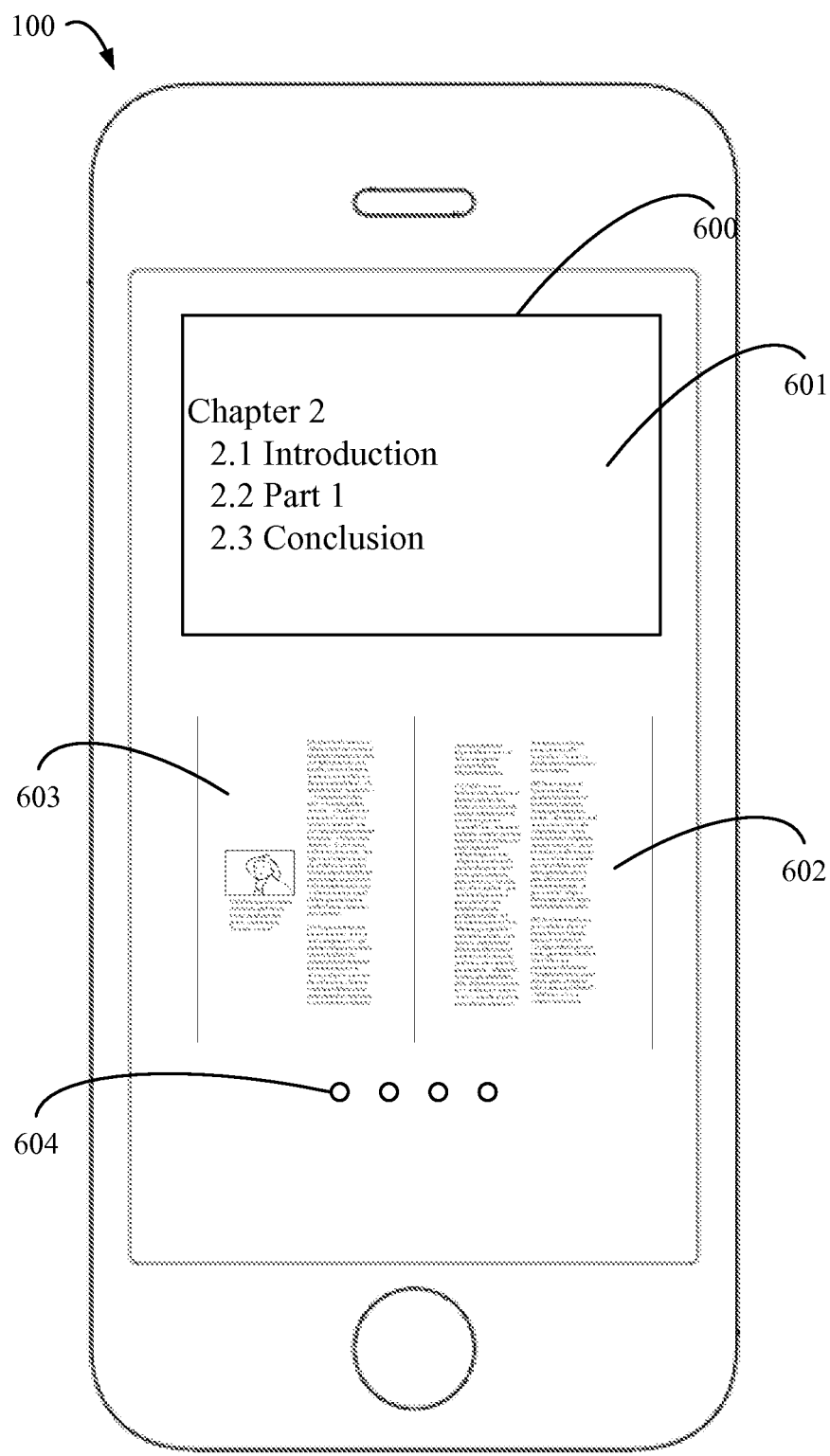
FIG. 6 shows an illustrative electronic device displaying a table of contents of a document, according to an exemplary embodiment.

FIG. 6 illustrates an electronic device 100 displaying a table of contents view 600 of a document, according to an exemplary embodiment.

If the user is in the full-page mode, as shown in FIG. 1, and the user, for example, swipes downward (from top to bottom) or pinches the display, the user can exit the full-page mode and can enter a table of contents view 600 of the document, as shown in FIG. 6. The table of contents view 600 can show the table of contents 601 of, for example, content in a particular chapter of a textbook and can include cover images. Additionally, the table of contents view can include thumbnail views of pages of the chapter, such as pages 602 and 603 of the chapter.

Two pages are shown in FIG. 6, however, one or more pages can be shown. A user can scroll through the different chapters in the book using for example, buttons 604. For example, each of the buttons 604 can correspond to a different chapter. A top to bottom swipe is described with respect to FIG. 6, however, this is merely an example. The gesture can include, for example, a motion from bottom to top to enter the table of contents view 600. Further, in the table of contents view 600, if the user swipes from top to bottom, the book can be exited.

Figure 7:
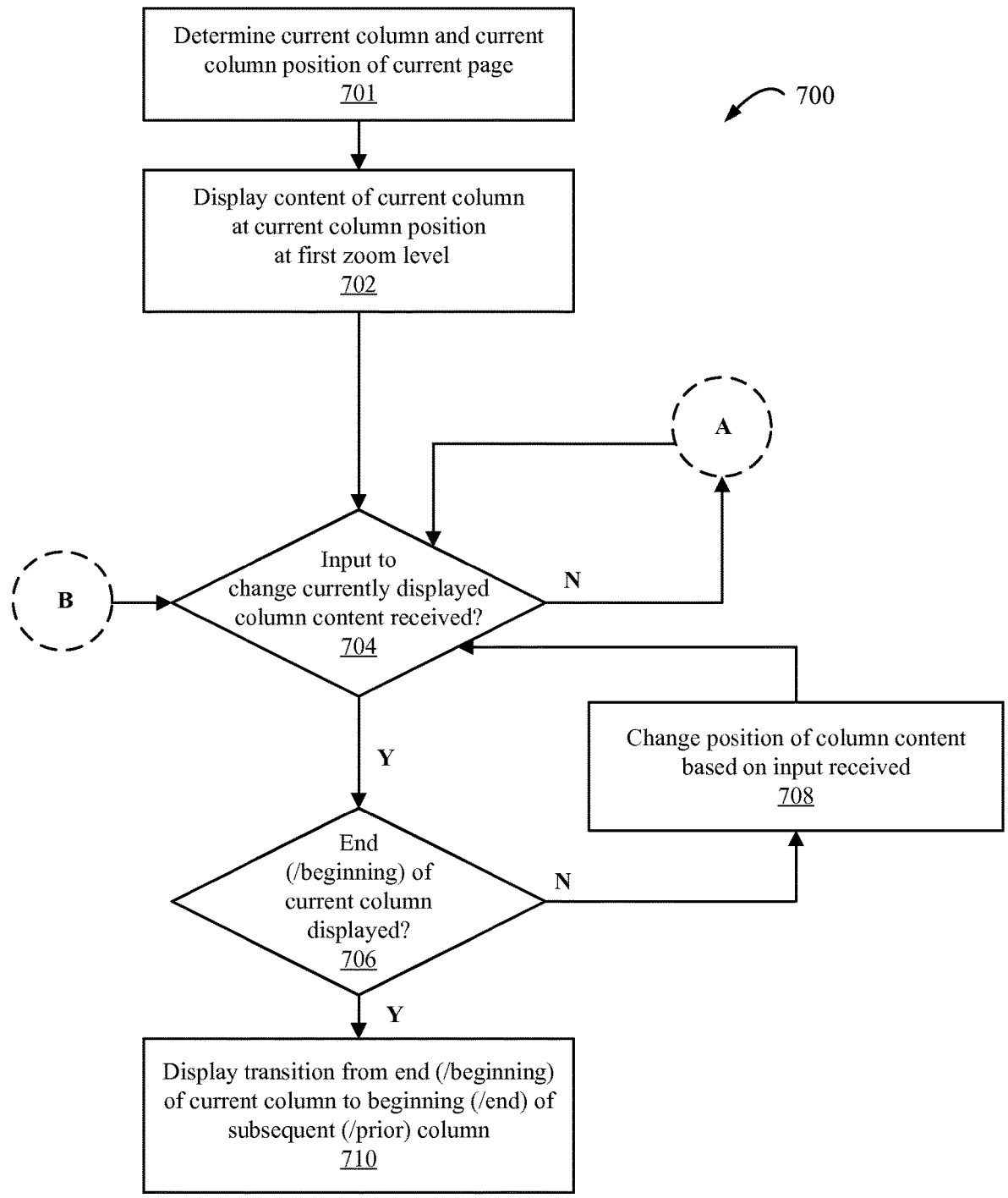
FIG. 7 is a flow diagram indicating exemplary operations of a method for transition within a document from displaying a current column to displaying another column, according to an exemplary embodiment.

FIG. 7 is a flow diagram indicating exemplary operations of a method 700 for transition within a document from displaying a current column of the document to displaying another column of the document, according to an exemplary embodiment.

At operation 701, electronic device 100 may determine a current column and/or a current column position. For example, if a document is being accessed for the first time on electronic device 100, a current column may be a first column (e.g., column 106) from a first page (e.g., page 104) of the document and a current column position may be, e.g., an upper portion of the first column. When the document is accessed on subsequent occasions, electronic device 100 may determine the current column and current column position to be a most recently visited column and column position of the document. A user may move forward and backward in the document to access columns preceding and/or following the currently displayed column.

At operation 702, electronic device 100 may display, by display 102, the determined current column (e.g., column 106) at the determined column position (e.g., an upper portion of column 106). The current column may be displayed at a first zoom level.

At decision diamond 704, electronic device 100 may determine whether an input to change the currently displayed column content is received. For example, electronic device 100 may determine whether a column advancement input such as the upward swipe 300 as illustrated in FIG. 3A or a right-to-left swipe 400 as shown in FIG. 4A, has been received. If no input to change the currently displayed column content has been received, flow may return to operation 704. In alternative exemplary embodiments, if no input to change currently displayed column content has been received, flow may proceed to decision diamond 900, as indicated by optional operation A. If input to change currently displayed column content has been received, flow may proceed to operation 706.

At decision diamond 706, electronic device 100 may determine whether the end of the current column is currently displayed (e.g., if the input is input to move forward within a document). Alternatively, if the received input is input to move backward through a document, decision diamond 706 may determine whether the beginning of the current column is currently displayed. For example, electronic device 100 may determine whether the end of column 106 is currently displayed by display 102. If the end (for forward movement through the document) or beginning (for backward movement through the document) of the current column is not currently displayed, flow may proceed to operation 708. If the end (for forward movement through the document) or beginning (for backward movement through the document) of the current column is not currently displayed, flow may proceed to operation 710.

At operation 708, electronic device 100 may change the position of column content based on the received input (e.g., as determined at decision diamond 704). For example, for forward movement thought the document, the advancement of the column content may be a transition from displaying an upper portion of a column (e.g., an upper portion of column 106, as illustrated at FIG. 3A) to displaying a lower portion of the column (e.g., a lower portion of column 106, as illustrated at FIG. 3B). The transition may be indicated with an animation, e.g., as discussed with regard to FIGS. 3A-3B.

At operation 710, electronic device 100 may transition from displaying a portion of a first column to displaying a portion of another column. For example, for forward movement through the document, electronic device 100 may transition from displaying a lower portion of a current column (e.g., a lower portion of column 106, as illustrated at FIG. 4A) to displaying an upper portion of a subsequent column (e.g., an upper portion of column 108, as illustrated at FIG. 4B). The transition may be indicated with an animation, e.g., as discussed with regard to FIGS. 4A-4B.

In some exemplary embodiments, contextual information is provided during a transition between a current column and a subsequent column (e.g., columns 106, 108). For example, as the transition from a lower portion of a current column to an upper portion of a subsequent column occurs, page 104 may be shown at a first zoom level when the lower portion of the current column is displayed, at a second zoom level during the transition, and at the first zoom level when the upper portion of the subsequent column is displayed. The animated transitions from the first zoom level to the second zoom level and from the second zoom level to the first zoom level may be gradual transitions. The second zoom level may be a lower level of zoom (i.e., more content from page 104 is shown) than the first zoom level. In this way, a user is provided with information about the content of page 104 for the period of time during which the transition from a current column to a subsequent column occurs. The gradual transitions between zoom levels allow for a smooth and visually appealing indication of the progress of the transition. In some exemplary embodiments, the animated transition from the first zoom level to the second zoom level occurs at a slower rate than the animated transition from the second zoom level to the first zoom level.

A first type of transition may occur when input described with regard to FIGS. 3A-3B and 4A-4B is received and a second type of transition may occur when a different type of input is received. For example, the first type of transition may involve no change in zoom level, whereas the second type of transition may involve a change from a first zoom level to a second zoom level as described above. In another example, the first type of transition may involve a change from a first zoom level to a second zoom level as described above and the second type of transition may involve a change from a first zoom level to a third zoom level. The third zoom level may be a lower level of zoom than either the first zoom level or the second zoom level. In various exemplary embodiments, a second and/or third zoom level of page 104 as described above may allow two or more columns (e.g., columns 106, 108) to be viewed simultaneously during the transition.

Figure 8:
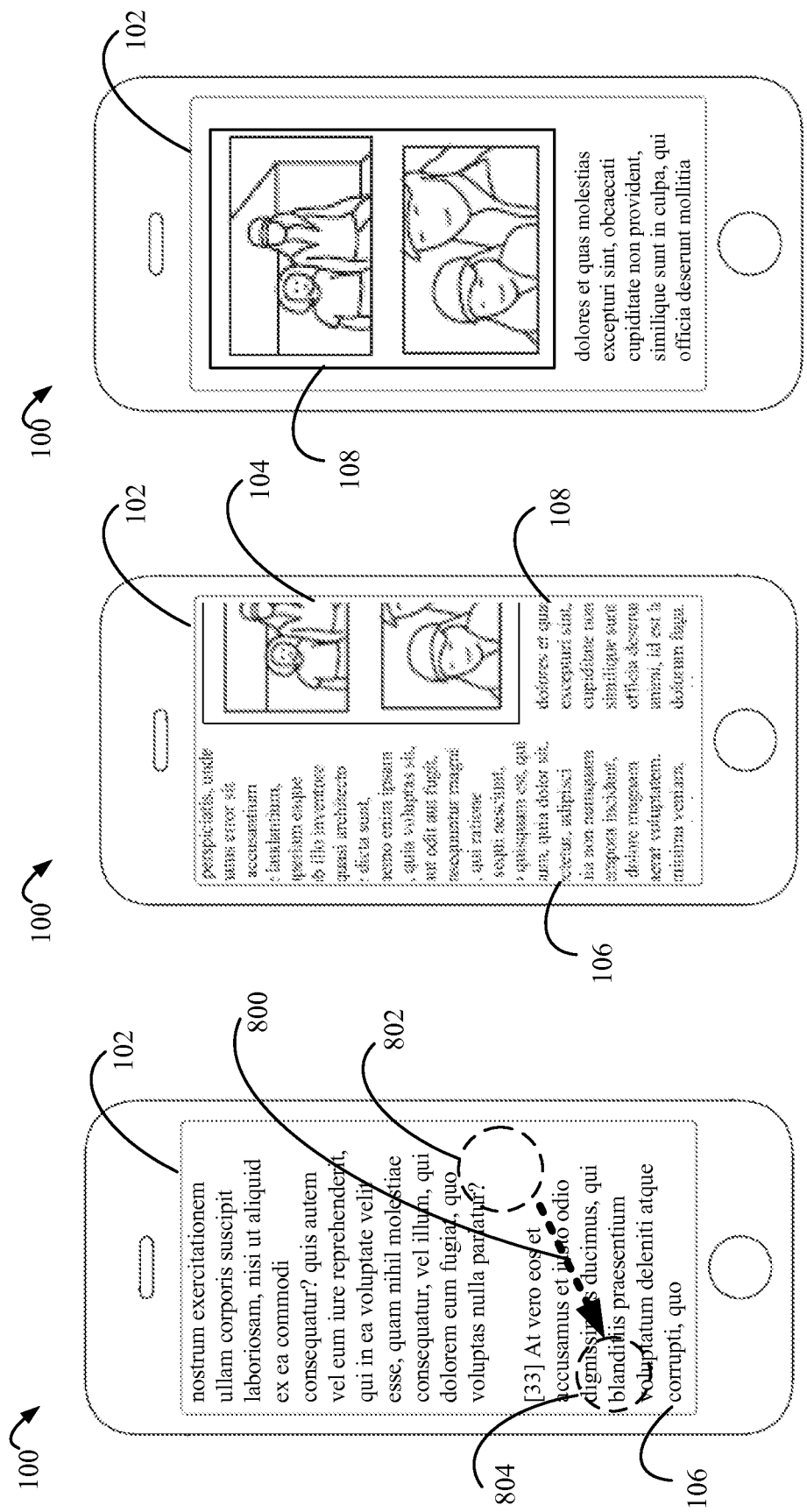
FIGS. 8A, 8B, and 8C illustrate a transition from a current column of a page to a subsequent column of the page, including display of the page at various zoom levels during the transition, according to an exemplary embodiment.

FIGS. 8A, 8B, and 8C illustrate a transition from a current column 106 of page 104 to a subsequent column 108 of page 104 including display of page 104 at various zoom levels during the transition.

At FIG. 8A, a lower portion of the content of column 106 is displayed by display 102 at a first zoom level in which a single column view of column 106 is displayed. At the first zoom level, the width of column 106 may be equal or substantially equivalent to the width of display 102. At FIG. 8B, page 104 is displayed by display 102 at a second zoom level in which part or all of both column 106 and column 108 are visible within display 102. The second zoom level may be an intermediate zoom level in which column 106 and/or column 108 are partially visible within the display. The second zoom level may alternatively be a whole page zoom level in which column 106 and column 108 are wholly visible within display 102. At FIG. 8C, an upper portion of the content of column 108 is displayed by display 102 at the first zoom level. In FIG. 8C, a single column view of column 108 is displayed. The width of column 108 may be equal or substantially equivalent to the width of display 102.

The change in zoom levels can assist a user in navigating through columns of a document in a pan-guide mode. For example, decreasing the zoom level as the user pans through a document can assist a user in determining associated content on the page or content in a next or previous column. Further, the speed of the animation or changes in the zoom level can vary according to the speed of the gesture. For example, a flick can result in a faster animation while swipe can result in a slower animation.

Electronic device 100 may transition from displaying a lower portion of column 106 to an upper portion of column 108 in response to user input received at electronic device 100. Electronic device 100 may use an animation to indicate the transition as (and/or after) the input gesture is received. For example, page 104 may be animated such that it appears to slide diagonally to the lower left as the transition from the content displayed in FIG. 8A to the content displayed in FIG. 8B occurs. Page 104 may be animated such that it appears to zoom in quickly (i.e., "snap") from displaying page 104 at the second zoom level to displaying the top of column 108 at the first zoom level, i.e., the rate of the transition from FIG. 8B to FIG. 8C may be greater than the rate of the transition from FIG. 8A to FIG. 8B.

The transition from the display of the lower portion of the content of column 106 as indicated at FIG. 8A to the display of the upper portion of the content of column 108, as indicated at FIG. 8C may be presented as a gradual animated transition as (and/or after) input 800 occurs. For example, the animated transition may follow a "Z-shape" (e.g., in which the page slides to the left, subsequently slides diagonally or vertically downward, and subsequently slides to the right), an "S-shape," a diagonal line, reverse Z-shape (e.g., for moving to the prior column), reverse S-shape, or another transition pattern. It will be recognized that other directions, types, and rates of animation may be used to illustrate the transition from FIG. 8A to FIG. 8B and the transition from FIG. 8B to FIG. 8C. For example, the shape of the movement can vary according to the location of the text on a next column or if an image appears before text on a on next column.

Electronic device 100 may perform the transition illustrated in FIGS. 8A-8C in response to a gesture input received at a touch-sensitive surface of electronic device 100. For example, the gesture input may be an input 800 that occurs when user swipes or flicks diagonally by dragging a finger along display 102, e.g., from an upper right contact position indicated by circle 802 of FIG. 8A to a lower left contact position indicated by circle 804 of FIG. 8A. It will be recognized that alternative gestures as described herein may be used as input 800. In response to received input 800, electronic device may display a transition to a portion of page 104 including column 106 and column 108, as shown in FIG. 8B, and a further transition to a portion of the content of column 108, as indicated at FIG. 8C.

The transitions described with regard to FIGS. 8A-8C may be used for transitioning from a column of a current page to a column of a subsequent page or a column of a previous page. For example, after the transition from the column view shown in FIG. 8A to the zoomed out page view shown in FIG. 8B has occurred, electronic device 100 may receive continued or further user input (e.g., a horizontal dragging motion or drag-and-hold motion) to advance to a subsequent page following page 104 shown in FIG. 8B. A user may continue to provide input to view a series of pages, as described further below with regard to FIGS. 10, 11 and 12.

Figure 9:
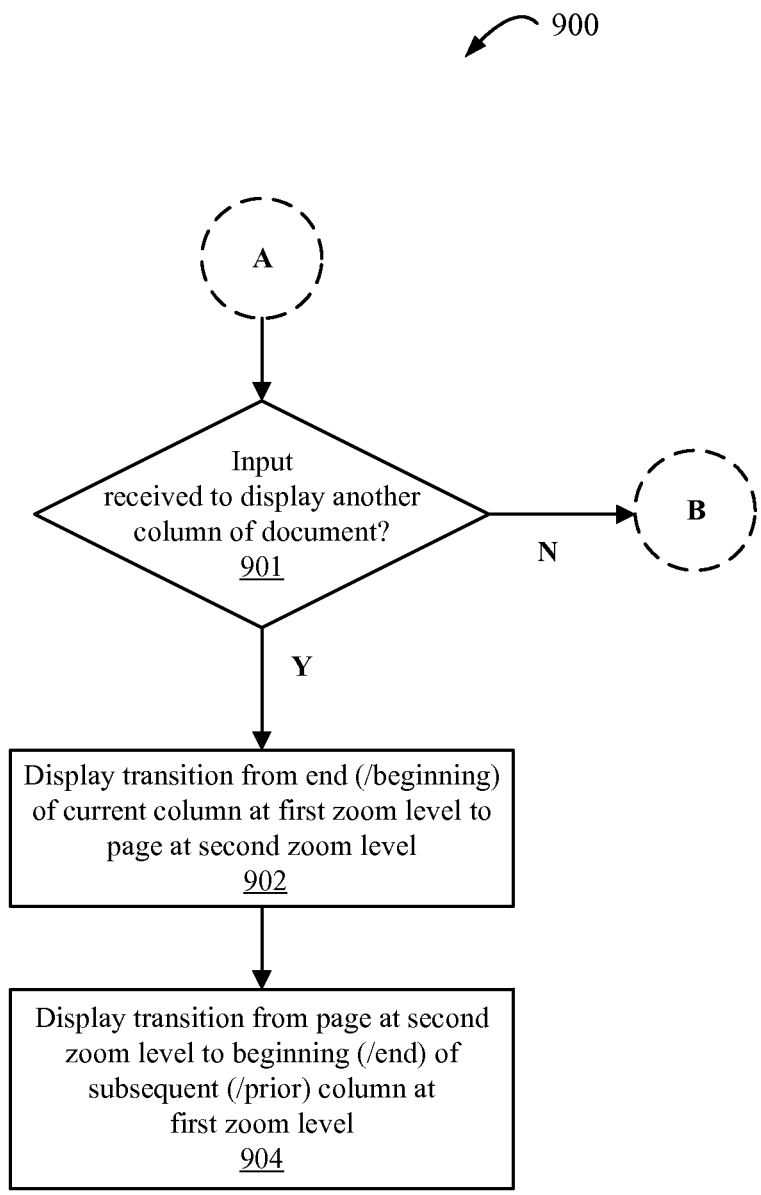
FIG. 9 is a flow diagram indicating exemplary operations of a method for transition within a document from displaying a current column to displaying another column, including display of the document at various zoom levels during the transition, according to an exemplary embodiment.

FIG. 9 is a flow diagram indicating exemplary operations of a method 900 for movement within a document from displaying a first column to displaying another column, according to an exemplary embodiment.

At decision diamond 901, electronic device 100 may determine whether an input to move to a different column is received. The input may be an input to advance to a subsequent column or an input to view a prior column of the document. For example, electronic device 100 may determine whether an input such as the diagonal swipe 800 as illustrated in FIG. 8A has been received. If no input to move to a different column has been received, flow may return to decision diamond 704, as indicated at operation B. If an input to move to a different column has been received, flow may proceed to operation 902.

At operation 902, electronic device 100 may transition from displaying a portion of a first column to a portion of another column of a document.

For example, if the input is an input to advance to a subsequent column, the transition may be a transition from displaying a lower portion of a first column (e.g., a lower portion of column 106, as illustrated at FIG. 8A) at a first zoom level to displaying page 104 at a second zoom level, e.g., as illustrated at FIG. 8B. The second zoom level may be a lower level than the first zoom level, such that a larger portion of page 104 is visible within display 102. For example, part or all of columns 106 and 108 may be visible within display 102 when page 104 is displayed at the second zoom level.

At operation 904, electronic device 100 may transition from displaying a page at the second zoom level (e.g., as illustrated at FIG. 8B) to displaying another column at the first zoom level. For example, electronic device 100 may transition from displaying page 104 at a second zoom level to displaying an upper portion of a subsequent column (e.g., an upper portion of column 108, as illustrated at FIG. 8C). The transition may be indicated with an animation, e.g., as discussed with regard to FIGS. 8A-8C.

In various exemplary embodiments, operation 902 may occur before operation 904, operation 902 may occur after operation 904, or operations 902 and 904 may occur simultaneously or substantially simultaneously.

In some exemplary embodiments, a drag gesture (e.g., horizontal swipe) may be used to traverse multiple columns or multiple pages and, when the drag gesture is terminated with a hold gesture, a column displayed when the hold gesture is received may be displayed. A hold gesture may be, for example, a sustained contact received at a single part of a display. When the drag gesture is terminated with a liftoff gesture, a page displayed when the liftoff gesture is received may be displayed. A liftoff may be a removal of the contacting element (e.g., finger) used for the drag gesture or other gesture as the gesture is received.

Figure 10:
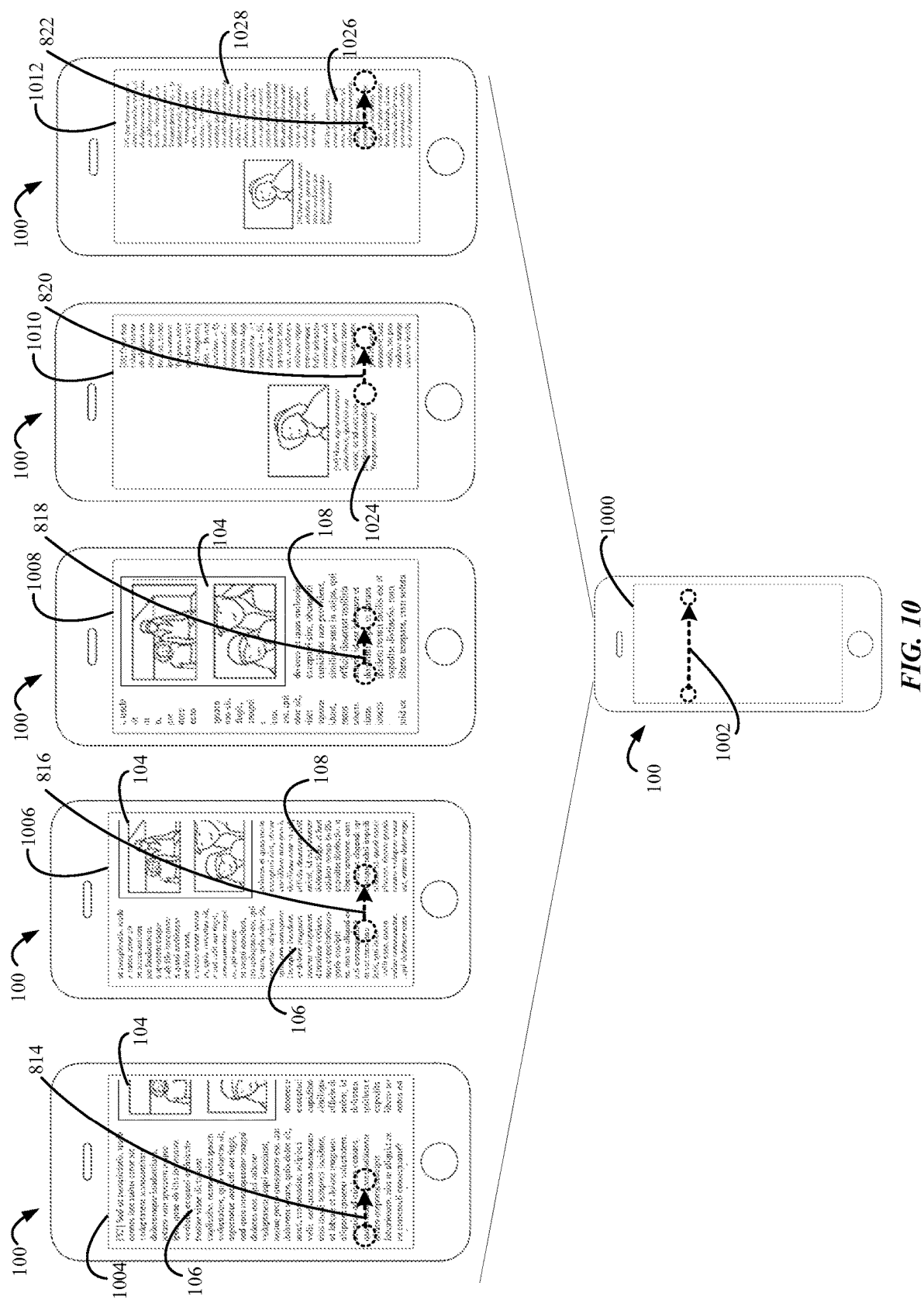
FIG. 10 shows an illustrative electronic device traversing multiple columns of a document, according to an exemplary embodiment.

FIG. 10 shows an illustrative electronic device 100 displaying a sequence of multiple columns 106, 108, 1024, 1026, as shown at 1000, 1004, 1006, 1008, 1010 and 1012, respectively, according to an exemplary embodiment. Electronic device 100 may receive input for traversing multiple columns. The input may be, for example, a continuous horizontal swipe (i.e. dragging motion) as shown at 1002. Continuous horizontal swipe 1002 is additionally shown as a series of component swipes 1014, 1016, 1018, 1020, and 1022 of continuous horizontal swipe 1002, as indicated at 1004, 1006, 1008, 1010, and 1012, respectively. A first time frame of swipe 1002 is shown at 1014, a second time frame following the first time frame of swipe 1002 is shown at 1016, and so on for 1018, 1020, 1022. In some exemplary embodiments, each time a page boundary is traversed in response to received user input, the subsequent page may be displayed at a whole page zoom level or intermediate zoom level (e.g., as described with regard to FIG. 1 and FIG. 8B, respectively).

As input 1002 is received, a sequence of pages, such as a first page 104 and a second page 1028, may be displayed. In some exemplary embodiments, a page is shown at different zoom levels each time a column of the page is traversed. For example, as page 104 is traversed, page 104 is shown at a first zoom level at 1004 such that column 106 is predominantly displayed, page 104 is shown at a second zoom level at 1006 such that both columns are equally displayed, and page 104 is shown at the first zoom level at 1008 such that column 108 is predominantly displayed. Similarly, as the user continues providing input 1002 to traverse from page 104 to page 1028, page 1028 is shown at the first zoom level at 1010 such that column 1024 is predominantly displayed, page 1028 is shown at a second zoom level at 1012 such that both columns of page 1028 are equally displayed, and so on.

The amount of content of the column displayed at the first zoom level and second zoom level described with regard to 1004-1012 may differ from the illustrative example of FIG. 10. For example, at a first zoom level, a single column may be displayed. At a second zoom level, part or all of two or more columns may be displayed. If the device is in a landscape mode, additional content can be seen on the display as compared with the portrait mode shown in FIG. 10. For example, content from part of a previous page or content from part of a subsequent page can also be displayed when scrolling through pages of the document.

Where two columns are described as "equally displayed," it will be understood that the columns may be substantially equally displayed. For example, when a first column and a second column are substantially equally displayed, a size of a first column may vary from a size of a second column by no more than 25% (e.g., by no more than 10%) of the total column width.

Where a column is described as "predominantly displayed," the predominantly displayed column may consume, for example, more than 50% (e.g., by more than 70%) of the page.

Animated transitions as described herein may be used for the transitions between 1004-1006, 1006-1008, 1008-1010, and 1010-1012.

Electronic device 100 may receive a user input indicating that a predominantly displayed column is to be displayed in a column fit view (e.g., as shown at FIG. 2). The input may be, for example, a hold input received as a desired column is being traversed to select the column. If a user wishes to select column 108, then user may interrupt input 1002 by providing a hold input at the time that column 108 is predominantly displayed, as indicated at 1008. This sequence of gestures may be referred to as a "drag-hold" input. As a result, column 108 may be displayed in column fit view (e.g., as shown at FIG. 8C).

FIGS. 11A, 11B and 11C show an illustrative electronic device traversing a document having a page that does not include body text, according to an exemplary embodiment.

As shown in FIG. 11A, if a user is in guided-pan mode, a column 1101 is displayed in guided-pan mode. If the next page after column 1101 does not include any columns, that is the next page 1102 does not include any body text and only includes, for example, an image, then the image is displayed in a full-page mode as shown in FIG. 11B. When the user continues to the next column after page 1102, the top of column 1103 after page 1102 is displayed. If a page does not include text, and includes only, for example, an image, then the image with an image is displayed as a whole page. Therefore, the user can have a clearer and larger view of the image. However, the user can continue to scroll through the document in the guided-pan mode.

Figure 12:
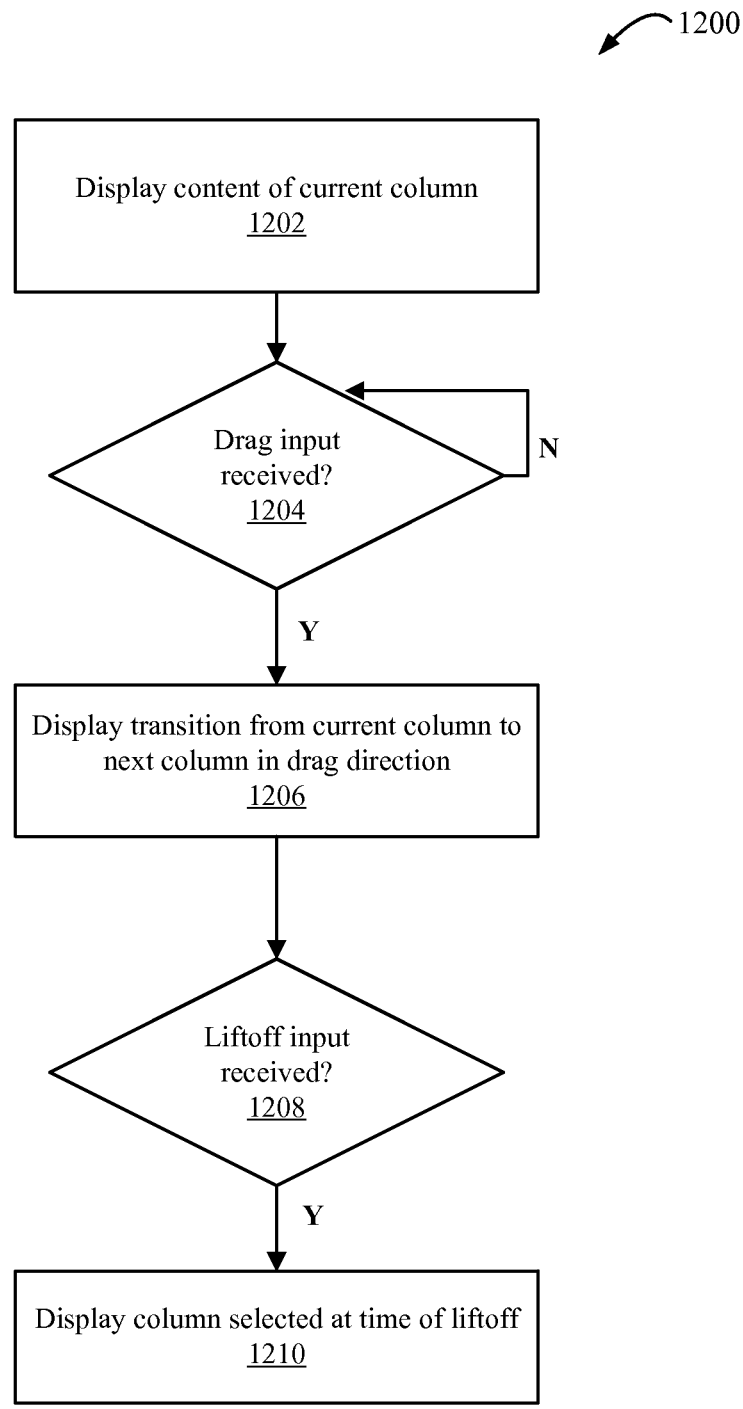
FIG. 12 is a flow diagram indicating exemplary operations of a method for displaying a sequence of multiple columns, according to an exemplary embodiment.

FIG. 12 is a flow diagram indicating exemplary operations of a method 1200 for displaying a sequence of multiple columns, according to an exemplary embodiment.

At operation 1202, electronic device 100 may display, by display 102, a current column (e.g., column 106) at a current column position (e.g., an upper portion of column 106). The current column may be displayed at a first zoom level such that a single column is displayed by display 102.

At decision diamond 1204, electronic device 100 may determine whether an input to change from displaying a current column to displaying another column is received. For example, electronic device 100 may determine whether a horizontal drag input has been received. If no input to change from displaying a current column to displaying a next column has been received, flow may return to operation 1204. If input to change from displaying a current column to displaying a next column has been received, flow may proceed to operation 1206.

At operation 1206, electronic device 100 may display a transition from a current column to a next column in a direction indicated by the received input. For example, if the input to change from displaying a current column to displaying another column is a left-to-right drag, e.g., as indicated at 1014-1018 of drag 1002, a transition from a first column to a subsequent column may be shown, e.g., a transition from column 106 to column 108 as indicated at 1004-1008. In some exemplary embodiments, page 104 may be shown at a first zoom level, as indicated at 1004, a second zoom level, as indicated at 1006, and again at the first zoom level, as indicated at 1008, as the left-to-right drag occurs.

In another example, an input to change from displaying a current column to displaying another column may be a right-to-left drag. In this example, a column prior to the currently displayed column may be displayed at operation 1206.

At decision diamond 1208, electronic device 100 may determine whether a liftoff input is received. A user may terminate a drag input with a liftoff input when a column the user desires to view is predominantly displayed. If a liftoff input is received, flow may proceed to operation 1210.

At operation 1210, electronic device 100 may display the column selected at the time of liftoff. For example, the column selected at the time of liftoff may be a column predominantly displayed when the liftoff input is received. The current column may be displayed at the first zoom level such that a single column is displayed by display 102 (e.g., as shown at FIG. 4B). For example, if a liftoff input is received when column 108 is predominantly displayed, as indicated at 1008, column 108 may be displayed by display 102 (e.g., at the zoom level indicated in FIG. 4B) in response to the received liftoff input.

It will be recognized that alternative gestures or other inputs as discussed herein may be used in lieu of the drag, hold, and liftoff inputs discussed with regard to FIG. 12. Typically, the first, second, and third zoom levels are different zoom levels, although it will be recognized that some or all of these zoom levels may be the same zoom level.

In various exemplary embodiments, the velocity of the received input gesture may be used by electronic device 100 to determine whether to traverse a document as indicated with regard to FIGS. 8A-8C or to traverse the document as indicated with regard to FIG. 10. For example, when a velocity at which a contact with a touch-sensitive surface traverses the surface falls below a threshold rate, the traversal as described with regard to FIGS. 8A-8C may be used. When a velocity at which a contact with a touch-sensitive surface traverses the surface is above a threshold rate, the traversal as described with regard to FIG. 10 may be used. In some exemplary embodiments, a level of zoom with which a document is displayed may vary in proportion to a velocity of a received input gesture.

Figure 13:
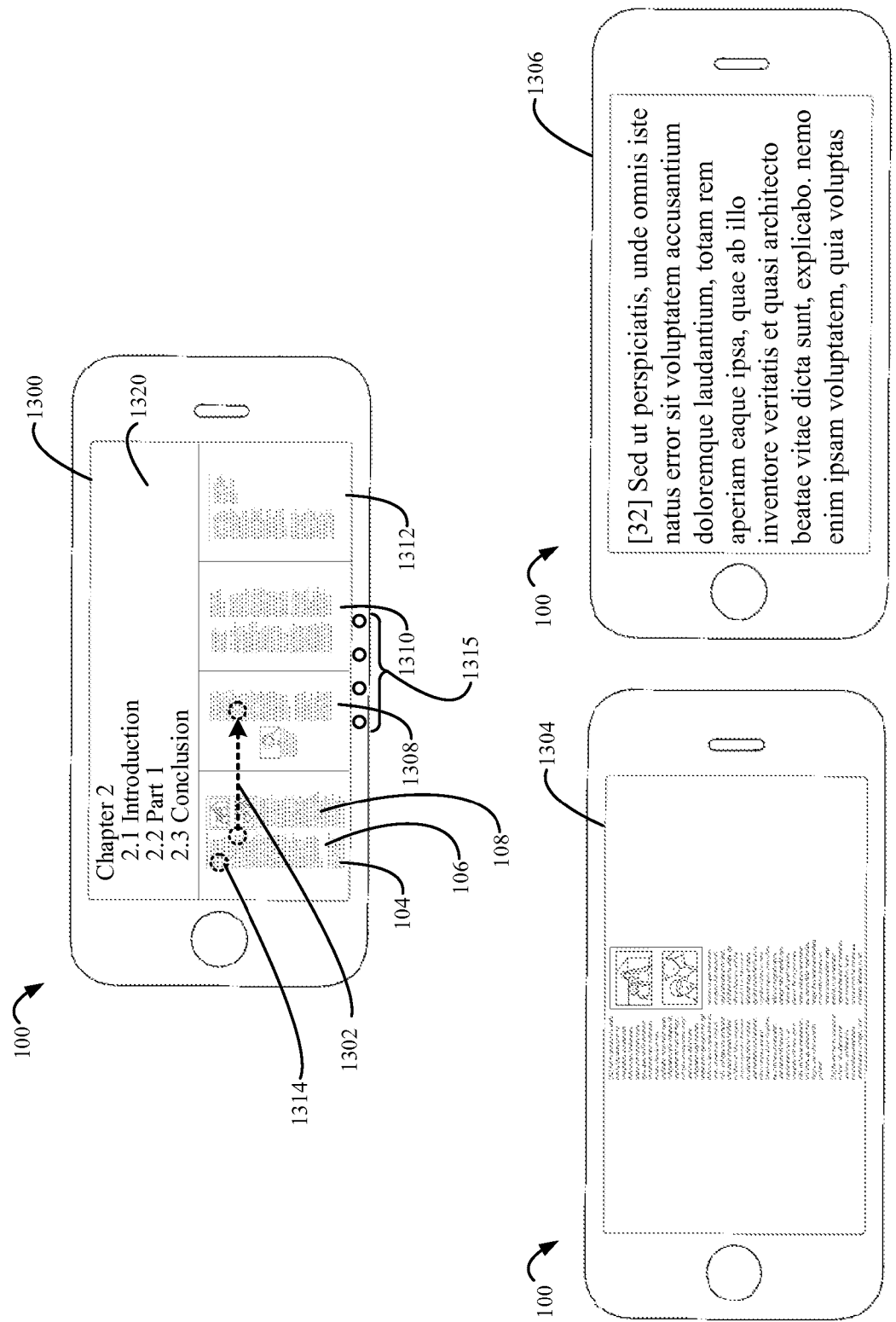
FIG. 13 shows an illustrative electronic device traversing multiple pages displayed simultaneously, according to an exemplary embodiment.

FIG. 13 shows an illustrative electronic device 100 that is in landscape mode and is capable of displaying multiple pages 104, 1308, 1310, 1312 simultaneously, according to an exemplary embodiment. As shown in table of contents view 1300, a region 1320 can display a table of contents for a particular chapter of a text book. Pages 104, 1308, 1310, 1312 can correspond to pages in the chapter. FIG. 13 illustrates page traversal when multiple pages are displayed simultaneously by electronic device 100. A continuous horizontal swipe (i.e., "drag" motion) may be used to traverse pages 104, 1308, 1310, 1312, and so on. In some exemplary embodiments, the speed with which the pages are traversed is related to the speed with which the dragging input is received.

Continuous horizontal swipe 1302 is shown traversing pages 104, 1308. As columns (e.g., 106, 108, etc.) of the pages are traversed, the zoom level of the page on which the columns are located may be adjusted, for example, as described with regard to FIG. 8. A user may provide input (e.g., release of the continuous horizontal swipe, a tap input, etc.) at a page to display the entire page in a full-page mode, as shown at 1304. For example, a user may tap on page 104 and the selected page 104 can appear on the display in full-page mode, as shown in 1304.

A user may provide a different input (e.g., hold position of continuous horizontal swipe, tap-and-hold, etc.) to display a column of a page in pan-guide mode. For example, holding a position at the contact point indicated at 1314 may result in the column at which the contact point is located being displayed in pan-guide mode as indicated at 1306.

Figure 14:
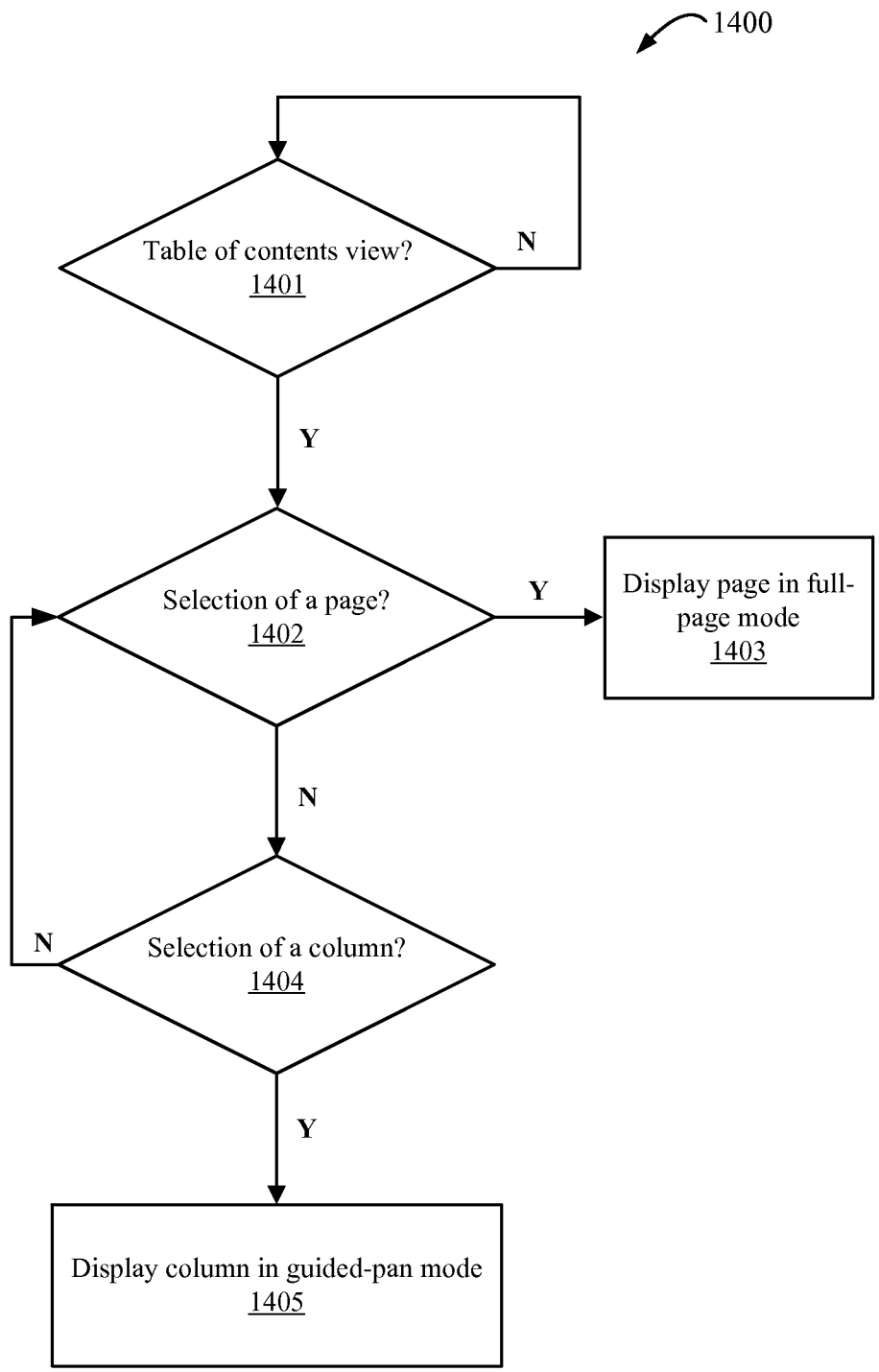
FIG. 14 is a flow diagram indicating exemplary operations of a method for transition within a document from displaying a table of contents to displaying a page in full-page mode or displaying a column in guided-pan mode, according to an exemplary embodiment.

FIG. 14 is a flow diagram indicating exemplary method 1400 for transition within a document from displaying a table of contents view as shown in 1300 to displaying a page in full-page mode as shown in 1304 or displaying a column in guided-pan mode as shown in 1306, according to an exemplary embodiment.

At decision diamond 1401, electronic device 100 may determine whether the table of contents view of a document is currently being viewed. If the table of contents view is not currently being viewed, then flow may return to operation 1401. If the table of contents view of a document is currently being viewed, flow may proceed to operation 1402.

At operation 1402, electronic device 100 can determine whether a page on the table of contents view is selected. For example, it is determined whether a user taps on page 104 that is displayed in the table of contents view. If a page is selected, at operation 1403, the page can be displayed in full-page mode. The user can then proceed to view the document in the full-page mode. If the page is not selected at operation 1402, flow can proceed to operation 1404.

At operation 1404, the electronic device 100 can determine whether a column of a page is selected. For example, it is determined whether a user selects and holds an area on a column of a page as identified by, for example, contact point 1314. If a column of page is selected, the selected column can be displayed in a guided-pan mode at operation 1405. The user can then proceed to view the document in the guided-pan mode.

In some exemplary embodiments, a gravity well is used within the boundaries of columns (e.g., within the boundaries of column 108 shown in 1008, 1300) to improve the ease with which a column may be selected. A gravity well can create, for example, a "pull" towards certain regions of a column, or a previous or subsequent column. A user can follow the pull of the gravity well or can choose to navigate to, for example, a different column. For example, at a region outside of column 108, a first ratio may exist between a rate of movement (e.g., movement of content or movement of a display position indicator) displayed by display 102 to the rate of movement of a pointing indicator. A pointing indicator may be, e.g., a finger moving along a touch-sensitive surface (e.g., a touchscreen or touchpad) or movement of a mouse.

At a region within a column, such as column 108, a second ratio may be used between a rate of movement of the display position indicator displayed by display 102 to the rate of movement of the pointing indicator. The second ratio may be lower than the first ratio. For example, the first ratio may be 1:1 and the second ratio may be 1:2, indicating that when the second ratio is in use (e.g., within a location on display 102 where column 108 is displayed), a pointing indicator must move twice as far to achieve the same rate of movement of the displayed position indicator as when the first ratio is in use (e.g., at a location on display 102 outside of any column regions). The gravity well at the column location allows a user to select a location within a column with ease because the pointing indicator moves more slowly within the selectable column than outside of the column area.

In some exemplary embodiments, traversal of a media file (such as an audio file, video file, etc.) corresponding to a document may occur as column fit document traversal of the same document occurs. For example, the input received to control column traversal as described with regard to FIGS. 3-13 may be provided using a control for traversing a media file, such as scrubber control, skip control, bookmark control or other control for navigating to a point within a media file. In some exemplary embodiments, traversal from a current column to a subsequent column and/or from a current page to a subsequent page may occur as a media file is playing. Similarly, traversal between columns and/or pages may occur as described herein during skipping forward, skipping back, fast forwarding, rewinding, playing in reverse, etc., within a media file. In some exemplary embodiments, displayed column content matches corresponding content of the media file (e.g., displayed text of a column matches spoken word of a corresponding audio file during playback of the audio file).

Figure 15:
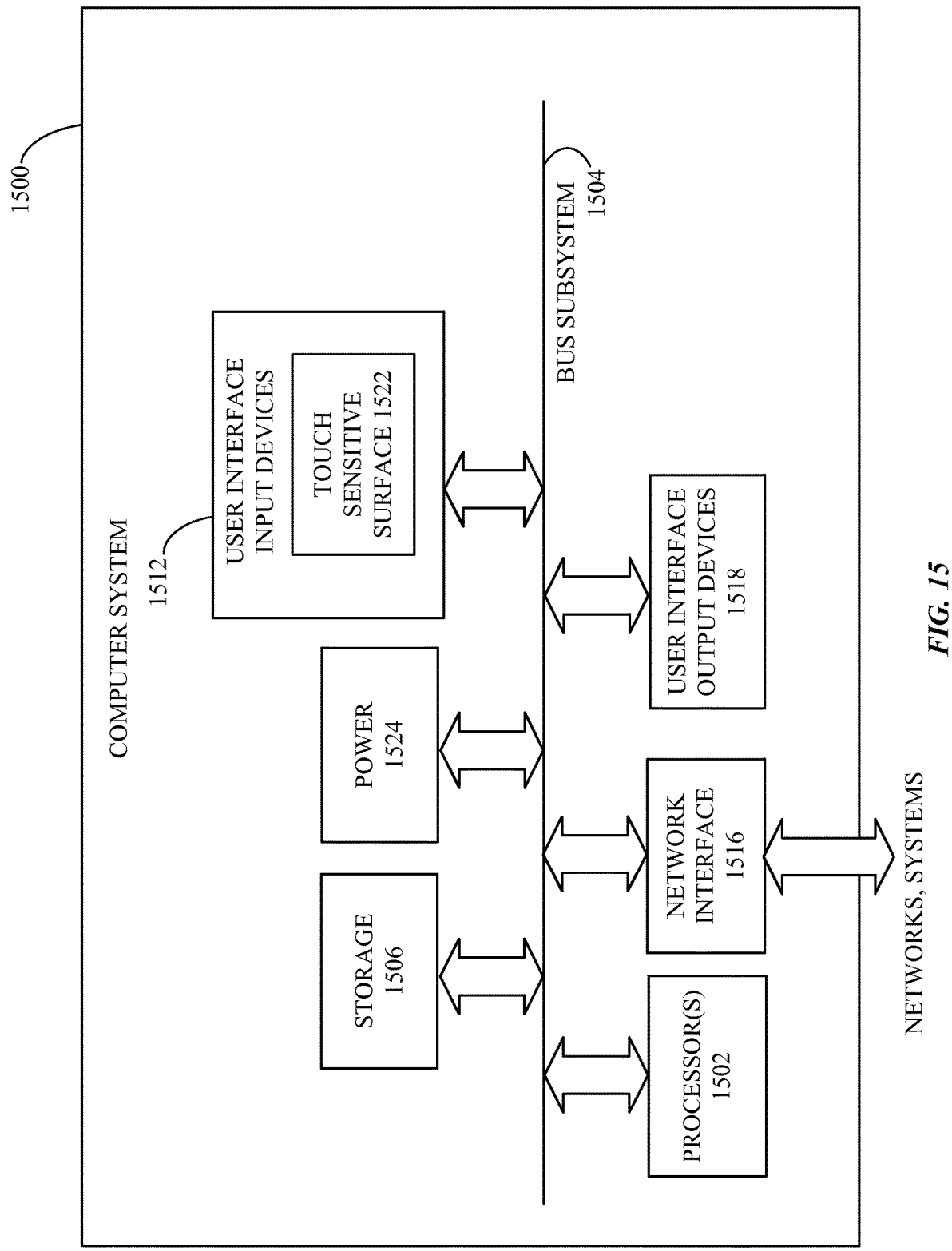
FIG. 15 is a simplified block diagram of a computer system, according to an exemplary embodiment.

Various exemplary embodiments of electronic device 100 may include any of the components described with regard to FIG. 15.

FIG. 15 is a simplified block diagram of a computer system 1500, according to an embodiment. Electronic device 100 optionally incorporates various elements as described with reference to FIG. 15. As shown in FIG. 15, computer system 1500 includes one or more processors 1502 that communicate with a number of subsystems via a bus subsystem 1504. These subsystems include, for example, a storage subsystem 1506, user interface input devices 1512, user interface output devices 1518, and a network interface subsystem 1516.

Bus subsystem 1504 provides a mechanism for letting the various components and subsystems of computer system 1500 communicate with each other as intended. Although bus subsystem 1504 is shown schematically as a single bus, alternative exemplary embodiments of the bus subsystem optionally utilize multiple busses.

Processor 1502, which can be implemented as one or more integrated circuits (e.g., a conventional microprocessor or microcontroller), controls the operation of computer system 1500. One or more processors 1502 are provided. These processors optionally include single core or multicore processors. In various exemplary embodiments, processor 1502 can execute a variety of programs in response to program code and can maintain multiple concurrently executing programs or processes. At any given time, some or all of the program code to be executed can be resident in processor(s) 1502 and/or in storage subsystem 1506. Through suitable programming, processor(s) 1502 can provide various functionalities described above.

Network interface subsystem 1516 provides an interface to other computer systems and networks. Network interface subsystem 1516 serves as an interface for receiving data from and transmitting data to other systems from computer system 1500. For example, network interface subsystem 1516 enables computer system 1500 to connect to one or more devices via the Internet. In some exemplary embodiments network interface 1516 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some exemplary embodiments network interface 1516 can provide wired network connectivity (e.g., Ethernet) in addition to or instead of a wireless interface.

User interface input devices 1512 optionally include a touch-sensitive surface 1522. User interface input devices optionally further include, pointing devices such as a mouse or trackball, a touchpad or touch screen incorporated into a display, a scroll wheel, a click wheel, a dial, a button, a switch, a keypad, audio input devices such as voice recognition systems, microphones, and other types of input devices. In general, use of the term "input device" is intended to include all possible types of devices and mechanisms for inputting information to computer system 1500.

User interface output devices 1518 optionally include a display subsystem, indicator lights, or non-visual displays such as audio output devices, etc. The display subsystem includes, for example, one or more of a cathode ray tube (CRT), a flat-panel device such as a liquid crystal display (LCD), a projection device, a touch screen, and the like. In general, use of the term "output device" is intended to include all possible types of devices and mechanisms for outputting information from computer system 1500.

Storage subsystem 1506 provides a computer-readable storage medium for storing the basic programming and data constructs that provide the functionality of some exemplary embodiments. Storage subsystem 1506 can be implemented, e.g., using disk, flash memory, or any other storage media in any combination, and can include volatile and/or non-volatile storage as desired. Software (programs, code modules, instructions) that when executed by a processor provide the functionality described above are stored in storage subsystem 1506. These software modules or instructions are executed by processor(s) 1502. The instructions may optionally be stored on a non-transitory storage device of storage subsystem 1506 either before or after execution by the processor(s) 1502. Storage subsystem 1506 also provides a repository for storing data used in accordance with the exemplary embodiments. Storage subsystem 1506 optionally includes a memory subsystem and a file/disk storage subsystem.

A memory subsystem optionally includes a number of memories including a main random access memory (RAM) for storage of instructions and data during program execution and a read only memory (ROM) in which fixed instructions are stored. A file storage subsystem provides persistent (non-volatile) storage for program and data files, and include, e.g., a hard disk drive, a floppy disk drive along with associated removable media, a Compact Disk Read Only Memory (CD-ROM) drive, an optical drive, removable media cartridges, and other like memory storage media.

The computer device 1500 also includes a power system 1524 for powering the various hardware components. The power system 1524 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

Computer system 1500 can be of various types including a personal computer (e.g., a MacBook®, an iMac®), a portable device (e.g., an iPhone®, an iPad®), a workstation, a network computer, a mainframe, a kiosk, a server or any other data processing system. Due to the ever-changing nature of computers and networks, the description of computer system 1500 depicted in FIG. 15 is intended only as a specific example. Many other configurations having more or fewer components than the system depicted in FIG. 15 are possible.

Various exemplary embodiments described above can be realized using any combination of dedicated components and/or programmable processors and/or other programmable devices. The various exemplary embodiments are implementable only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes optionally use different techniques, or the same pair of processes use different techniques at different times. Further, while the exemplary embodiments described above make reference to specific hardware and software components, those skilled in the art will appreciate that different combinations of hardware and/or software components are also be usable and that particular operations described as being implemented in hardware might also be implemented in software or vice versa.

The various exemplary embodiments are not restricted to operation within certain specific data processing environments, but are free to operate within a plurality of data processing environments. Additionally, although exemplary embodiments have been described using a particular series of transactions, this is not intended to be limiting.

Thus, although specific exemplary embodiments have been described, these are not intended to be limiting. Various modifications and equivalents are within the scope of the following claims.

What is claimed is:

1. A method comprising:

at an electronic device with one or more processors, a display, and memory:

selecting an electronic book including a first plurality of pages of text content corresponding to a second plurality of pages of a fixed format document, wherein a first page of the first plurality of pages comprises a first plurality of columns of text content corresponding to a second plurality of columns of text content of a second page of a second plurality of pages of the fixed format document;

displaying a page view of the electronic book including displaying the first plurality of columns of text content of the first page of the electronic book corresponding to the second plurality of columns of the second page of the fixed format document;

receiving a first input gesture on the first page of the electronic book;

determining whether the first input gesture is for viewing the electronic book in a guided-pan mode, wherein the guided-pan mode comprises displaying, at a given time, only one column of text content of the first plurality of columns of text content of the electronic book during traversal of text content of the electronic book;

in response to determining that the first input gesture is for viewing the electronic book in the guided-pan mode:

displaying, by the display, a column fit view of the electronic book in a column fit format, wherein the column fit format comprises formatting the text content of the electronic book into the first plurality of columns of text content corresponding to the second plurality of columns of text content of the page of the fixed format document; and in response to receiving a second input gesture that is within a gravity well boundary of a first column of the first page, directing a user to traverse to a second column of the electronic book.

2. The method of claim 1, wherein the content of the electronic book displayed in the column fit format corresponds to an area of the electronic book on which the first input gesture was input.

3. The method of claim 1, wherein in the column fit format the content of the electronic book corresponding to a column is formatted to fit an entirety of the column.

4. The method of claim 2, wherein if a lower portion of a first column is being displayed, a top portion of a second column, which is subsequent to the first column, is displayed in response to a subsequent column gesture.

5. The method of claim 2, wherein if a top portion of a first column is being displayed, a bottom portion of a third column, which is previous to the first column, is displayed in response to a previous column gesture.

6. The method of claim 4, wherein an animated transition of the content is displayed during a transition of displaying the lower portion of the first column to the top portion of the second column.

7. The method of claim 6, wherein a speed of the animated transition corresponds to an input speed of the subsequent column gesture.

8. The method according to claim 1, further comprising determining whether the first input gesture is for viewing the electronic book in a page view mode;

in response to determining that the first input gesture is for viewing the electronic book in the page view mode:

maintaining displaying, by the display, of the content of the electronic book in the page view; and in response to receiving the second input gesture, traversing through the electronic book in the page view mode, wherein the page view mode comprises traversing through the electronic book a full page at a time.

9. The method according to claim 1, wherein the first input gesture comprises a double tap gesture.

10. The method according to claim 1 wherein the second input gesture comprises a pan gesture.

11. The method according to claim 1, wherein in response to receiving the first input gesture on a first column of the electronic book, displaying the first column in the column fit view on the display.

12. The method according to claim 1, wherein each of the plurality of columns of the electronic book comprises a boundary region with a gravity well, and wherein the gravity well pulls the user to a previous column or a subsequent column in response to an input gesture on the boundary region.

13. The method according to claim 12, wherein the boundary region is a region of the first column outside of the text content of the first column.

14. The method according to claim 12, wherein a rate of movement of the display in the boundary region is slower than a rate of movement of the display in a non-boundary region.

15. An electronic device, comprising:

one or more processors;

a display communicatively coupled to the one or more processors;

memory; and one or more programs, wherein the one or more programs are stored in the memory and configured to be executed by the one or more processors, the one or more programs including instructions for:

selecting an electronic book including a first plurality of pages of text content corresponding to a second plurality of pages of a fixed format document, wherein a first page of the first plurality of pages comprises a first plurality of columns of text context corresponding to a second plurality of columns of text content of a second page of a second plurality of pages of the fixed format document;

displaying a page view of the electronic book including displaying the first plurality of columns of text content of the first page of the electronic book corresponding to the second plurality of columns of the second page of the fixed format document;

receiving a first input gesture on the first page of the electronic book;

determining whether the first input gesture is for viewing the electronic book in a guided-pan mode, wherein the guided-pan mode comprises displaying, at a given time, only one column of text content of the first plurality of columns of text content of the electronic book during traversal of content of the electronic book during traversal of text content of the electronic book;

in response to determining that the first input gesture is for viewing the electronic book in the guided-pan mode:

displaying, by the display, a column fit view of the electronic book in a column fit format, wherein the column fit format comprises formatting the text content of the electronic book into the first plurality of columns of text content corresponding to the second plurality of columns of text content of the page of the fixed format document; and in response to receiving a second input gesture that is within a gravity well boundary of a first column of the first page, directing a user to traverse to a second column of the electronic book.

16. The electronic device according to claim 15, further comprising determining whether the first input gesture is for viewing the electronic book in a page view mode;

in response to determining that the first input gesture is for viewing the electronic book in the page view mode:

maintaining displaying, by the display, of the content of the electronic book in the page view; and in response to receiving the second input gesture, traversing through the electronic book in the page view mode, wherein the page view mode comprises traversing through the electronic book a full page at a time.

17. The electronic device according to claim 15, wherein the content of the electronic book displayed in the column fit format corresponds to an area of the electronic book on which the first input gesture was input.

18. The electronic device according to claim 15, wherein in the column fit format the content of the electronic book corresponding to a column is formatted to fit an entirety of the column.

19. A non-transitory computer readable storage medium storing one or more programs, the one or more programs comprising instructions, that, when executed by an electronic device having one or more processors and a memory, cause the electronic device to:

select an electronic book including a first plurality of pages of text content corresponding to a second plurality of pages of a fixed format document, wherein a first page of the first plurality of pages comprises a first plurality of columns of text content corresponding to a second plurality of columns of text content of a second page of a second plurality of pages of the fixed format document;

display a page view of the electronic book including displaying the first plurality of columns of text content of the first page of the electronic book corresponding to the second plurality of columns of the second page of the fixed format document;

receive a first input gesture on the first page of the electronic book;

determine whether the first input gesture is for viewing the electronic book in a guided-pan mode, wherein the guided-pan mode comprises displaying, at a given time, only one column of text content of the first plurality of columns of text content of the electronic book during traversal of text content of the electronic book;

in response to determining that the first input gesture is for viewing the electronic book in the guided-pan mode:

display, by the display, a column fit view of the electronic book in a column fit format, wherein the column fit format comprises formatting the text content of the electronic book into the first plurality of columns of text content corresponding to the second plurality of columns of text content of the page of the fixed format document; and in response to receiving a second input gesture that is within a gravity well boundary of a first column of the first page, directing a user to traverse to a second column of the electronic book.

20. The non-transitory computer readable storage medium according to claim 19, further comprising determining whether the first input gesture is for viewing the electronic book in a page view mode;

in response to determining that the first input gesture is for viewing the electronic book in the page view mode:

maintaining displaying, by the display, of the content of the electronic book in the page view; and in response to receiving the second input gesture, traversing through the electronic book in the page view mode, wherein the page view mode comprises traversing through the electronic book a full page at a time.

21. The non-transitory computer readable storage medium according to claim 19, wherein the content of the electronic book displayed in the column fit format corresponds to an area of the electronic book on which the first input gesture was input.

22. The non-transitory computer readable storage medium according to claim 19, wherein in the column fit format the content of the electronic book corresponding to a column is formatted to fit an entirety of the column.

* * * * *